US008275753B2

(12) United States Patent
Ichikawa

(10) Patent No.: US 8,275,753 B2
(45) Date of Patent: Sep. 25, 2012

(54) COMPUTER READABLE MEDIUM AND INFORMATION MANAGEMENT SYSTEM

(75) Inventor: Takehiro Ichikawa, Kawasaki (JP)

(73) Assignee: Fuji Xerox Co., Ltd., Tokyo (JP)

(*) Notice: Subject to any disclaimer, the term of this patent is extended or adjusted under 35 U.S.C. 154(b) by 432 days.

(21) Appl. No.: 12/558,660

(22) Filed: Sep. 14, 2009

(65) Prior Publication Data

US 2010/0185591 A1 Jul. 22, 2010

(30) Foreign Application Priority Data

Jan. 22, 2009 (JP) ................................ 2009-011696

(51) Int. Cl.
*G06F 7/00* (2006.01)
*G06F 17/00* (2006.01)
(52) U.S. Cl. . 707/679; 707/751; 707/918; 707/E17.112; 707/E17.11; 709/203; 709/219
(58) Field of Classification Search .......... 707/674, 707/781, E17.002, E17.01, 679, 751, 918, 707/E17.112, E17.11; 709/203, 219
See application file for complete search history.

(56) References Cited

U.S. PATENT DOCUMENTS

| | | | | |
|---|---|---|---|---|
| 5,949,492 A | * | 9/1999 | Mankovitz | 709/203 |
| 7,010,437 B2 | * | 3/2006 | Lubkeman et al. | 700/286 |
| 2002/0025138 A1 | * | 2/2002 | Isobe et al. | 386/95 |
| 2003/0028592 A1 | * | 2/2003 | Ooho et al. | 709/203 |
| 2005/0198185 A1 | * | 9/2005 | Yamaoka et al. | 709/208 |
| 2006/0005206 A1 | * | 1/2006 | Schneider | 719/319 |
| 2006/0129537 A1 | * | 6/2006 | Torii et al. | 707/3 |
| 2006/0179087 A1 | * | 8/2006 | Fujii et al. | 707/205 |
| 2006/0277226 A1 | * | 12/2006 | Chikusa et al. | 707/201 |
| 2007/0260643 A1 | * | 11/2007 | Borden et al. | 707/201 |
| 2008/0059497 A1 | | 3/2008 | Ishibe et al. | |
| 2008/0155319 A1 | * | 6/2008 | Duncan et al. | 714/13 |
| 2008/0281908 A1 | * | 11/2008 | McCanne et al. | 709/203 |
| 2010/0286997 A1 | * | 11/2010 | Srinivasan | 707/E17.01 |

FOREIGN PATENT DOCUMENTS

| | | |
|---|---|---|
| EP | 1 148 416 B1 * | 8/2000 |
| JP | 2001-117800 A | 4/2001 |
| JP | 2002-366410 A | 12/2002 |

(Continued)

OTHER PUBLICATIONS

Garces et al.—"A regional database management system—the fisheries resource information system and tools (FiRST): Its design, utility and future directions"—Fisheries Research vol. 78, Issues 2-3, May 2006, pp. 119-129.*

(Continued)

*Primary Examiner* — John E Breene
*Assistant Examiner* — Anh Ly
(74) *Attorney, Agent, or Firm* — Sughrue Mion, PLLC

(57) ABSTRACT

An information management method includes: when management subject information corresponds to the second location and another pieces of management subject information having the same contents as the management subject information is made correspond to the second location, deleting the said another management subject information except for the management subject information previously associated with the second location. Also, the method includes: changing the corresponding destination of the management subject information to a first location from the second location. And the method includes: when the management subject information is associated with plural pieces of restoration information, changing another corresponding destination from the second location to a location designated among plural first locations respectively shown by plural pieces of restoration information.

6 Claims, 21 Drawing Sheets

FOREIGN PATENT DOCUMENTS

| | | |
|---|---|---|
| JP | 2003-256285 A | 9/2003 |
| JP | 2004-362418 A | 12/2004 |
| JP | 2007-310481 A | 11/2007 |
| JP | 2008-059036 A | 3/2008 |

OTHER PUBLICATIONS

Terrance D. Nielsen—"Outage Management Systems Real-Time Dashboard Assessment Study"—Power Engineering Society General Meeting, 2007. IEEE, Date of Conference: Jun. 24-28, 2007, (pp. 1-3).*

O-Hoon Choi, Jaewon-Kim, Jung-Eun Lim and Doo-Kwon Baik—"A Design of Location Information Management System in Positioning Systems"—2007 International Conference on Convergence Information Technology—(pp. 114-120).*

Japanese Office Action, dated Oct. 28, 2010, issued in application No. 2009-011696.

* cited by examiner

FIG. 11

| | | | | 1100 |
|---|---|---|---|---|
| 1110 | TRASH BOX | | | |
| 1120 | HISTORY DISPLAY (REPORT) | | | |
| 1130 | SERVER NAME | OPERATION DAY/TIME | OPERATION KIND | OPERATION USER |
| | X | 2008/08/25 14:27 | VERSION ADDITION | USER A |
| | X | 2008/08/16 09:30 | DOWNLOAD | USER A |
| | X | 2008/08/15 21:56 | DOWNLOAD | USER B |
| | X | 2008/08/11 13:33 | UNLOCK | USER A |
| | X | 2008/08/10 18:20 | LOCK | USER B |
| | X | 2008/08/02 17:50 | DOWNLOAD | USER B |
| | X | 2008/08/01 14:23 | VERSION ADDITION | USER A |
| | X | 2008/08/01 12:00 | PREPARATION | USER B |

FIG. 12

| 1201 | 1202 | 1203 | 1204 | 1205 | 1206 | 1207 | 1208 |
|---|---|---|---|---|---|---|---|
| NUMBER | NAME | DELETED PERSON | DELETED DAY/TIME | SERVER | PATH UPON DELETION | HISTORY ID | HASH VALUE |
| 1 | REPORT | USER A | 2008/08/30 15:35 | X | DEVELOPMENT DEPARTMENT 1¥1T¥TASK ACTIVITY | 1 | 6f9e8d46c4e5afa1ee5a881114ee3b9e |

| HISTORY ID | SERVER | OPERATION DAY/TIME | OPERATION KIND | OPERATION USER |
|---|---|---|---|---|
| 1 | X | 2008/08/25 14:27 | VERSION ADDITION | USER A |
| 1 | X | 2008/08/16 09:30 | DOWNLOAD | USER A |
| 1 | X | 2008/08/15 21:56 | DOWNLOAD | USER B |
| 1 | X | 2008/08/11 13:33 | UNLOCK | USER A |
| 1 | X | 2008/08/10 18:20 | LOCK | USER B |
| 1 | X | 2008/08/02 17:50 | DOWNLOAD | USER B |
| 1 | X | 2008/08/01 14:23 | VERSION ADDITION | USER A |
| 1 | X | 2008/08/01 12:00 | PREPARATION | USER B |

FIG. 14

| 1201 | 1202 | 1203 | 1204 | 1205 | 1206 | 1207 | 1208 |
|---|---|---|---|---|---|---|---|
| NUMBER | NAME | DELETED PERSON | DELETED DAY/TIME | SERVER | PATH UPON DELETION | HISTORY ID | HASH VALUE |
| 1 | REPORT | USER A | 2008/08/30 15:35 | X | DEVELOPMENT DEPARTMENT 1¥1¥TASK ACTIVITY | 1 | 6f9e8d46c4e5afa1ee5a881114ee3b9e |
| 1 | REPORT | USER A | 2008/09/01 21:20 | Y | SHARED DOCUMENT > TASK RELATED | 2 | 6f9e8d46c4e5afa1ee5a881114ee3b9e |

| HISTORY ID | SERVER | OPERATION DAY/TIME | OPERATION KIND | OPERATION USER |
|---|---|---|---|---|
| 1 | X | 2008/08/25 14:27 | VERSION ADDITION | USER A |
| 1 | X | 2008/08/16 09:30 | DOWNLOAD | USER A |
| 1 | X | 2008/08/15 21:56 | DOWNLOAD | USER B |
| 1 | X | 2008/08/11 13:33 | UNLOCK | USER A |
| 1 | X | 2008/08/10 18:20 | LOCK | USER B |
| 1 | X | 2008/08/02 17:50 | DOWNLOAD | USER B |
| 1 | X | 2008/08/01 14:23 | VERSION ADDITION | USER A |
| 2 | Y | 2008/08/01 12:00 | PREPARATION | USER B |
| 2 | Y | 2008/08/28 19:00 | DOWNLOAD | USER R |
| 2 | Y | 2008/08/27 18:23 | DOWNLOAD | USER Q |
| 2 | Y | 2008/08/27 14:23 | DOWNLOAD | USER P |
| 2 | Y | 2008/08/26 13:00 | PREPARATION | USER A |
| 1 | X | 2008/09/03 21:10 | DOWNLOAD | USER B |
| 1 | X | 2008/09/01 14:15 | RESTORE FROM TRASH BOX SERVER | USER A |

FIG. 20

| HISTORY ID 1301 | SERVER 1302 | OPERATION DAY/TIME 1303 | OPERATION KIND 1304 | OPERATION USER 1305 |
|---|---|---|---|---|
| 1 | X | 2008/08/25 14:27 | VERSION ADDITION | USER A |
| 1 | X | 2008/08/16 09:30 | DOWNLOAD | USER A |
| 1 | X | 2008/08/15 21:56 | DOWNLOAD | USER B |
| 1 | X | 2008/08/11 13:23 | UNLOCK | USER A |
| 1 | X | 2008/08/10 18:20 | LOCK | USER B |
| 1 | X | 2008/08/02 17:50 | DOWNLOAD | USER B |
| 1 | X | 2008/08/01 14:23 | VERSION ADDITION | USER A |
| 1 | X | 2008/08/01 12:00 | PREPARATION | USER B |
| 2 | Y | 2008/08/28 19:00 | DOWNLOAD | USER R |
| 2 | Y | 2008/08/27 18:23 | DOWNLOAD | USER Q |
| 2 | Y | 2008/08/27 14:23 | DOWNLOAD | USER P |
| 2 | Y | 2008/08/26 13:00 | PREPARATION | USER A |

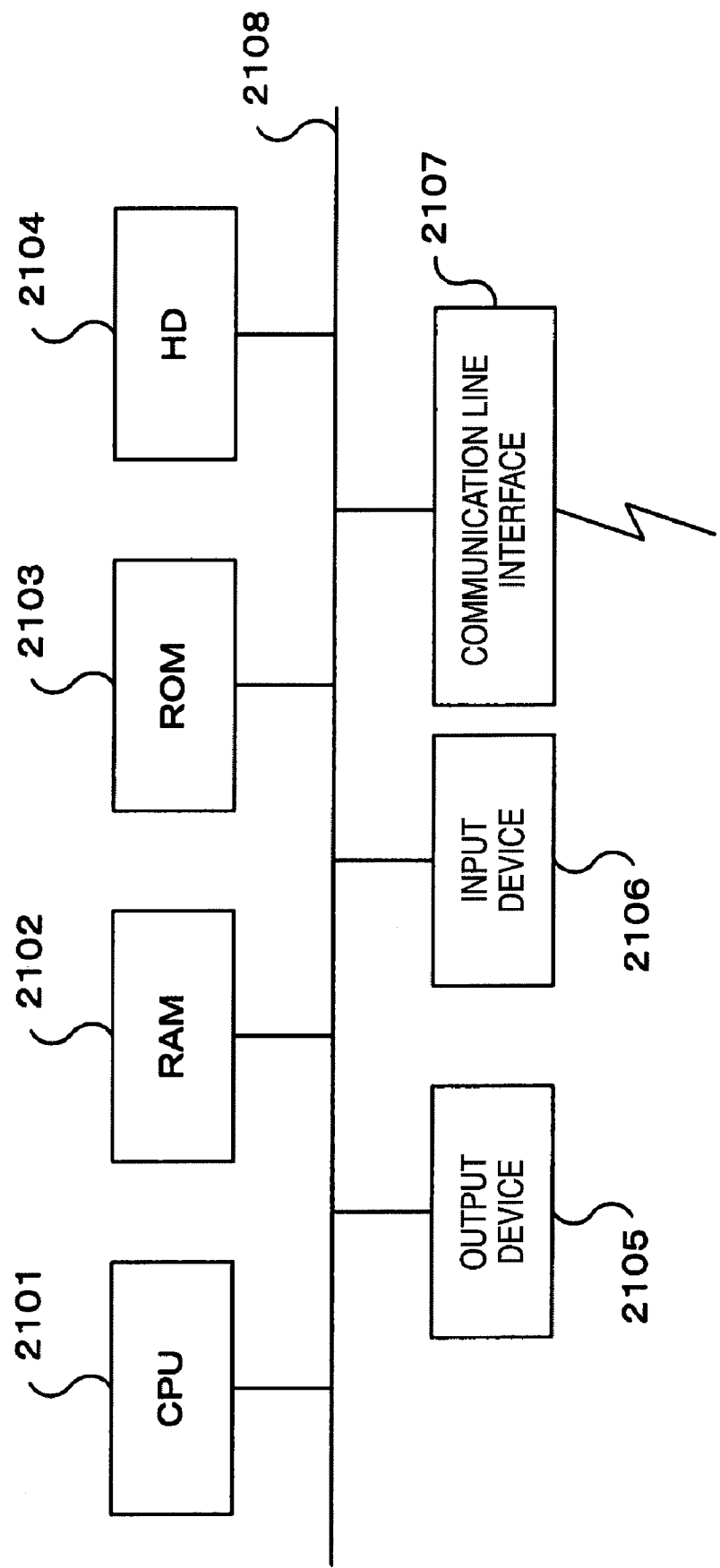

COMPUTER READABLE MEDIUM AND INFORMATION MANAGEMENT SYSTEM

CROSS-REFERENCE TO RELATED APPLICATIONS

This application is based on and claims priority under 35 USC 119 from Japanese Patent Application No. 2009-011696 filed on Jan. 22, 2009.

BACKGROUND

1. Technical Field

The present invention relates to a computer readable medium and an information management system.

2. Related Art

Concerning information to be managed as electronic information to be managed by a computer, there is a case that a plurality of information to be managed of the same contents locate in a distributed manner. In this case, sometimes the plurality of information to be managed is moved into a trash box for storing information to be managed as candidate to be discarded.

SUMMARY

According to an aspect of the invention, a computer readable medium storing a program causing a computer to execute a process for information management, the process includes: (a) storing into a management subject information storing unit, management subject information associated with a destination indicating a first location, wherein the management subject information indicates electronic information to be managed; (b) changing the destination of the management subject information to a second location from the first location; (c) deleting, in a case of the destination of the management subject information indicating the second location and changing another destination associated with another piece of management subject information to the second location from another first location, said another piece of management subject information wherein said another piece of management subject information has the same content as the management subject information; (d) storing restoration information associated with the management subject information into a restoration information storing unit, and storing another piece of restoration information also associated with the management subject information into the restoration information storing unit, wherein the restoration information indicates that the destination of the management subject information indicating the second location was the first location, and said another restoration information indicates that said another destination of said another management subject information indicating the second location was said another first location; (e) changing the destination of the management subject information to the first location from the second location based on the restoration information, and changing when said another restoration information is associated with the management subject information, said another destination of said another management subject information based on said another restoration information to the said another first location from the second location.

BRIEF DESCRIPTION OF THE DRAWINGS

Exemplary embodiment(s) of the present invention will be described in detail based on the following figures, wherein:

FIG. 11 is an explanatory diagram showing an example of the display of a history display screen;

FIG. 12 is an explanatory diagram showing an example of the data structure of the history table;

FIG. 13 is an explanatory diagram showing an example of the data structure of a history management table;

FIG. 14 is a diagram for explaining an example of the data structure of the history table after the update;

FIG. 17 is an explanatory diagram showing an example of the data structure of the history management table after the update;

FIG. 20 is an explanatory diagram showing an example of the data structure of a history management table after the update; and FIG. 21 is a block diagram showing an example of the hardware configuration of a computer for realizing the exemplary embodiment.

DETAILED DESCRIPTION

Hereinafter, exemplary embodiments for realizing the invention will be explained with reference to drawings.

Figure 1:
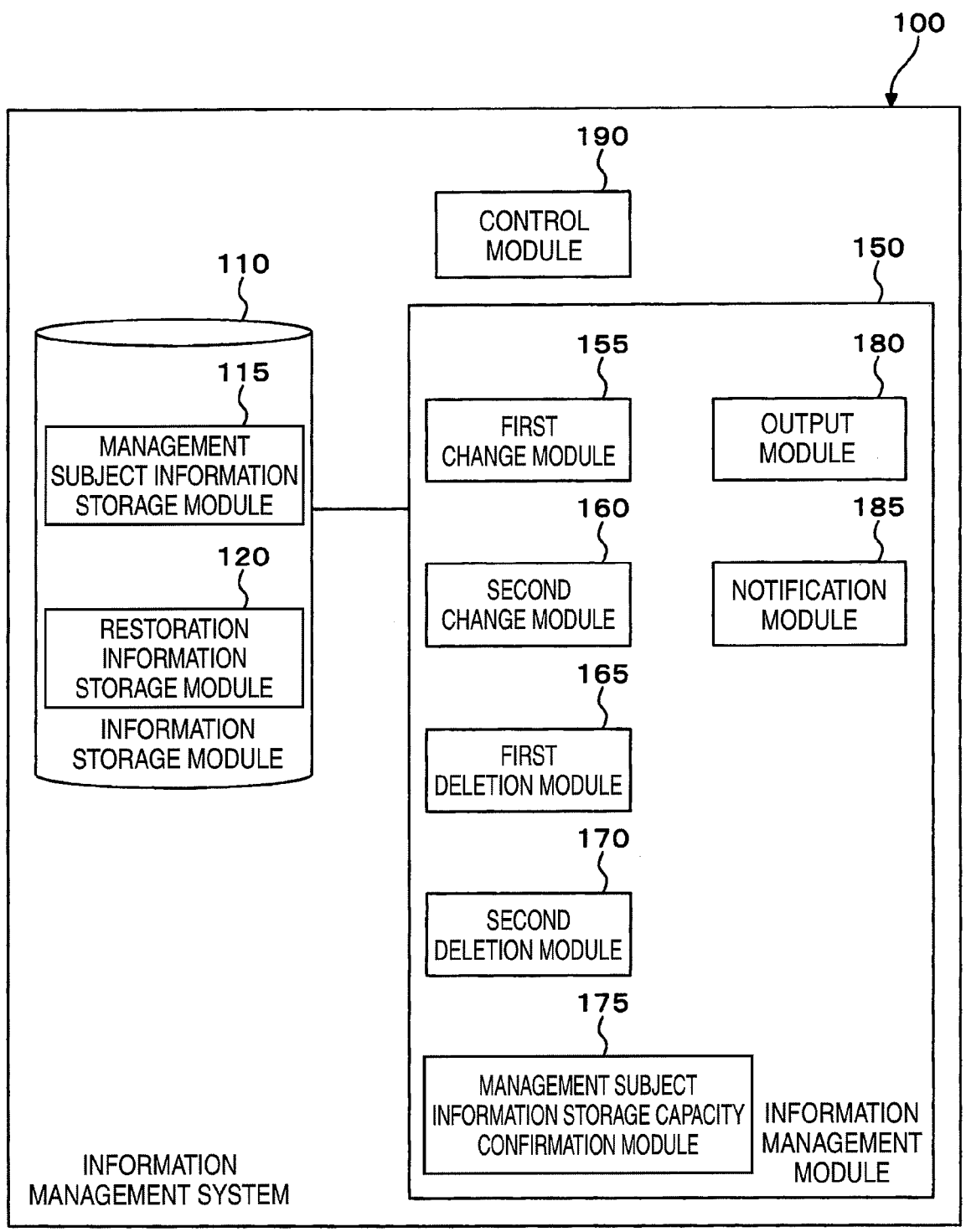
FIG. 1 is a diagram showing the conceptional module configuration as an example of the configuration of the exemplary embodiment.

FIG. 1 is a diagram showing the conceptional module configuration as an example of the configuration of the exemplary embodiment.

In general, the module represents a part such as a software (computer program) or a hardware capable of being separated logically. Thus, the modules in this exemplary embodiment represent modules of the hardware configuration as well as modules of the computer program. Therefore, this exemplary embodiment also serves to explain the system and the method as well as the computer program. For the sake of the explanation, although "stores", ""is stored" and similar expressions are used in the exemplary embodiment, these expressions respectively indicate storing in a storage device and controlling so as to store in the storage device when the exemplary embodiment relates to the computer program. Although the modules almost correspond to functions in a one-to-one corresponding manner, respectively, at the time of the mounting, the single module may be configured by the single program or the plural modules may be configured by the single program. In contrast, the single module may be configured by the plural programs. Further, the plural modules may be executed by the single computer or the single module may be executed by the plural computers in a distributed or parallel processing environment. The single module may contain another module. Further, hereinafter "couple" is used not only in the case of physical connection but also in the case of logical connection (reception and transmission of data, instruction, reference relation between data, etc.).

Further, the system or the device is configured in a manner that plural computers, plural hardware or devices etc. are coupled via a communication unit such as a network (including communication coupling of one-to-one correspondence) or configured by a single computer, a single hardware or a single device etc. The "device" and "system" are used as the expression of the same meaning. An expression "determining in advance" indicates determining before a processing to be performed, and also indicates not only determining before starting the processing of the exemplary embodiment but also determining before starting the processing to be performed even after starting the processing of the exemplary embodiment in accordance with a circumstance or state at that time or a circumstance or state heretofore. Furthermore, although the expression "management" is used, this expression is used so as to express to control, manage, or store data for the control or management in accordance with the context, and represents the role or operation thereof. For example, managing of historical information indicates obtaining the historical information and storing the historical information so as to be able to be referred from outside, etc.

An information management system 100 is configured to change the corresponding destination of the information to be managed or management subject information to a second location from a first location and to be able to restore the corresponding destination to the first location from the second location. As shown in FIG. 1, the information management system includes an information storage module 110, an information management module 150 and a control module 190. The information storage module 110 includes a management subject information storage module 115 and a restoration information storage module 120. The information management module 150 includes a first change module 155, a second change module 160, a first deletion module 165, a second deletion module 170, a management subject information storage capacity confirmation module 175, an output module 180 and a notification module 185. The information storage module 110 and the information management module 150 are coupled to each other. Although the explanation is made that the management subject information storage module 115 and the restoration information storage module 120 are disposed within the single information storage module 110, these information storage modules may be disposed within the single storage device or different storage devices, respectively. Further, these information storage modules are not required to be disposed within a single casing and may be mounted in different information processing apparatuses, respectively.

The management subject information storage module 115 stores the management subject information as electronic information to be managed in correspondence to at least one corresponding location.

The first change module 155 changes the corresponding destination of the management subject information from the first location to the second location. This change may be performed in response to the operation of a utilizing person for performing the change, for example.

The first deletion module 165, when the first change module changes another piece of management subject information from a corresponding first location to the second location, and said another piece of management subjection information has the same contents as the management subject information being made correspond to the second location, deletes said another piece of management subject information. The determination as to whether or not the plural management subject information have the same contents is performed by comparing the contents of the two management subject information but may be performed by calculating the hash values of the contents thereof and comparing the hash values thus calculated, for example. Alternatively, the determination may be performed by comparing the attributes of the respective management subject information such as names or preparation times thereof (for example, a single attribute (such as the name of the management subject information) or the combination of plural attributes may be used for the comparison). The contents of the management subject information may include not only the contents as the entity thereof but also the attribute thereof. As a result, one management subject information remains through the processing of the first deletion module 165.

The restoration information storage module 120 stores, in association with the management subject information, restoration information representing that the corresponding destination of the management subject information rendered so as to correspond to the second location by the first change module 155 is originally the first location. The restoration information storage module 120 stores the restoration information relating to said another management subject information deleted by the first change module 155 in association with the management subject information not deleted by the first change module 155. For example, the restoration information may be the historical information of the edition performed as to the management subject information. The historical information includes the first location having been corresponded before the corresponding operation to the second location. The restoration information relating to said another management subject information deleted by the first deletion module 165 is associated with the management subject information having not been deleted, by the restoration information storage module 120.

The second change module 160 changes, based on the restoration information associated with the management subject information which is made correspond to the second location, the corresponding destination of the management subject information to the first location from the second location. When the management subject information is related to plural pieces of the restoration information, the corresponding destination is changed to the location designated by one of the plural first corresponding destinations represented by the plural pieces of the restoration information. The designation is a predetermined designation, for example, performed by the operation of a utilizing person. According to the operation of the second change module 160, the management subject information returns to the state before being made correspond to the second location, that is, the state corresponding to the first location. Then, when said another management subject information is deleted by the first deletion module 165, it is indicated that plural pieces of the restoration information are made correspond to the management subject information to be restored, that is, there are plural first locations. Therefore, one from these first locations is required to be selected.

Further, the second change module 160, in the case of newly corresponding another management subject information to another first location, when said another management subject information having the same contents as the one management subject information is already made associated with the second location, the second change module 160 associates the restoration information being associated with the one management subject information with said another management subject information, and corresponds said another management subject information to said first location. In this case, the aforesaid processing is performed without influencing the one management subject information being made correspond to the second location and the restoration information corresponding to the one management subject information.

When the corresponding destination of the management subject information associated with second location is changed to first location or the correspondence to the second location is cancelled by the second change module 160, the second deletion module 170 deletes the restoration information corresponding to the management subject information. And the second deletion module 170 deletes the management subject information associated with the second location when all of pieces of the restoration information associated with the management subject information disappear. In the case of deleting the management subject information from the second location, since there is no management subject information being made correspond to the second location, the restoration information associated with the management subject information is also not necessary and so deleted.

Although there may arise a case that plural pieces of the restoration information associated with the management subject information, when all pieces of the restoration information associated with the management subject information are deleted by deleting the plurality of the restoration information (that is, when there is no management subject information to be resorted), these management subject information are also deleted. The deletion of the restoration information includes not only the deletion of the entirety of the restoration information but also the deletion of a part of the restoration information. In the case of the deletion of a part of the restoration information, the entirety of the restoration information may be deleted by deleting the part of the restoration information for plural times.

Further, in the case where one piece of restoration information is associated with the management subject information, when the management subject information is deleted from the second location, the restoration information associated with the one management subject information is also deleted. When all of plural pieces of the restoration information associated with the management subject information are deleted, not only the restoration information but also the management subject information is deleted.

The information management system 100 can perform the processing by the information management system 100 itself. Also, the information management system may perform the processing in a manner of being utilized by another information management system.

In the case where the number of pieces of the restoration information associated with the management subject information made correspond to the second location exceeds a predetermined number, when another piece of management subject information having the same contents is made correspond to a first location, the notification module 185 notifies the owner of said another management subject information made correspond to the first location that said another management subject information should be made correspond to the second location. In this respect, the management subject information is made correspond to a utilizing person who posses the management subject information. In other word, when plural pieces of the management subject information exist in a dispersed manner and some of the plural pieces of the management subject information are already made correspond to the second location, the notification transmits a possibility of the remaining management subject information being required to be made correspond to the second location. The notification includes merely pointing out such a state, urging so as to correspond to the second location, making correspond to the second location when permitted by the owner, etc. The notification may be performed by directly displaying on the information processing apparatus using the owner or transmitting an electronic mail, etc.

The management subject information storage capacity confirmation module 175 determines whether or not the number of the management subject information stored in the management subject information storage module 115 is a predetermined number or more, or determines whether or not the remaining capacity of the storage area of the management subject information storage module 115 is a predetermined value or less. In the case where the information management system performs the processing in a manner of being utilized by another information management system, the management subject information storage module 115 may be located within the another information management system.

When the management subject information storage capacity confirmation module 175 determines that the number of the management subject information stored in the management subject information storage module 115 is the predetermined number or more or that the remaining capacity of the storage area of the management subject information storage module 115 is the predetermined value or less, the notification module 185 may perform the notification. For example, when the remaining capacity of the storage area of the management subject information storage module 115 storing the management subject information is small, the notification module 185 performs the notification.

The output module 180 outputs the location corresponding to the management subject information and information relating to the management subject information in an associated manner. For example, the output module 180 outputs a list of the management subject information made correspond to the second location. In this case, when the management subject information of the same contents is deleted by the first deletion module 165, since the management subject information thus deleted is not displayed, the number of the management subject information to be displayed reduces. As a concrete example, only one management subject information is displayed. When plural pieces of the restoration information are associated with the management subject information, the restoration information may be displayed at every management subject information. That is, although the number of the management subject information to be displayed is not increased, the restoration information may displayed selectively among the plurality of the restoration information.

The control module 190 controls the modules within the information storage module 110, and the information management module 150 to thereby manage the management subject information and the corresponding locations made correspond to the management subject information.

Figure 2:
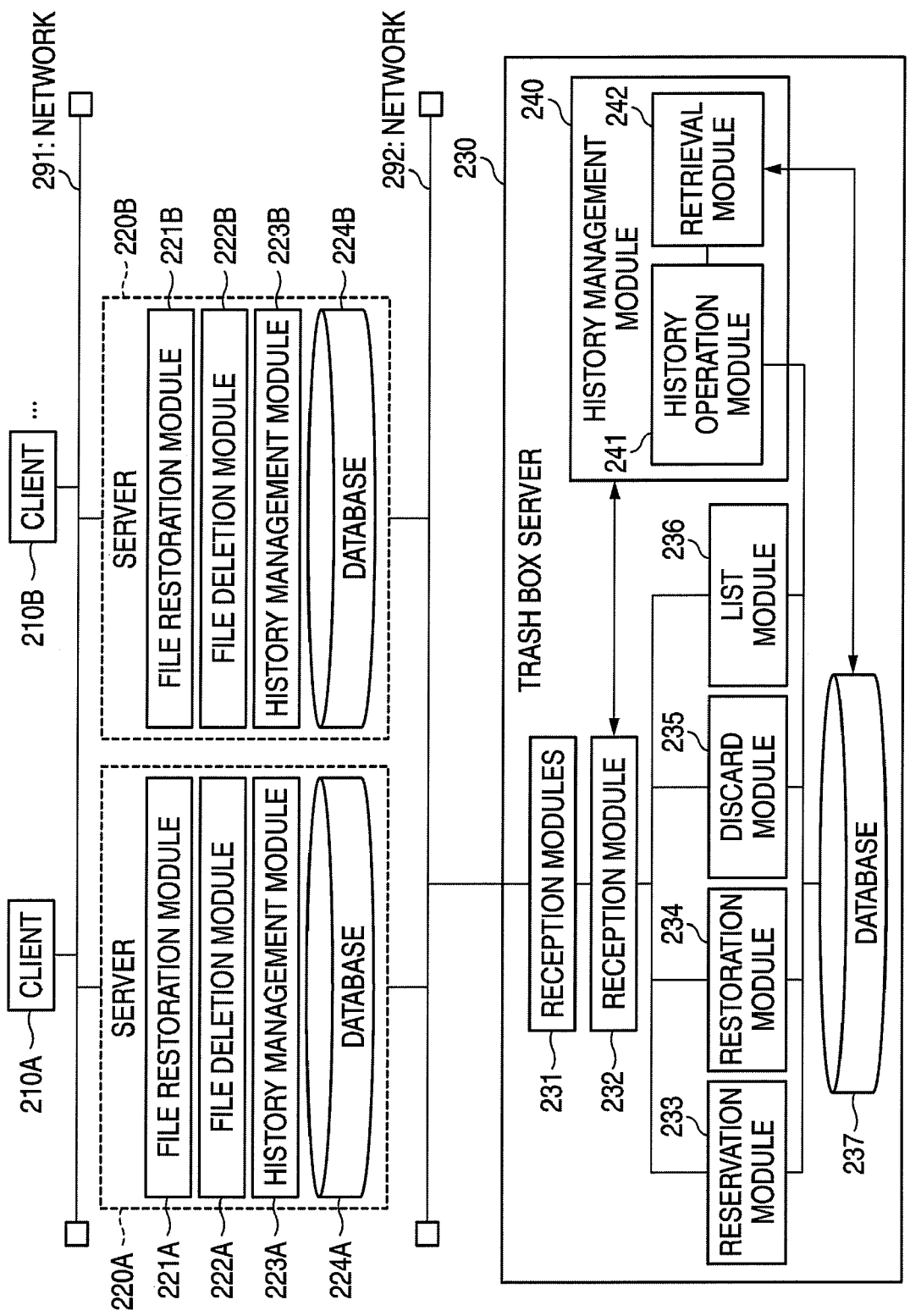
FIG. 2 is a diagram showing the module configuration as an example of the configuration for realizing the exemplary embodiment.

FIG. 2 is a diagram showing the module configuration as an example of the configuration for realizing the exemplary embodiment.

Hereinafter, the explanation will be made mainly as to a file as electronic information as an example of the management subject information. A file can be defined as electronic data of text, image, motion picture, music etc. or the combination thereof, and a unit of configuration with a name which can be stored, edited or retrieved etc., and further as being capable of being exchanged as an independent unit between systems or utilizing persons. Furthermore, a file contains one similar to that defined in the aforesaid manner. As a concrete example, a file is a document or an electronic mail etc. prepared by a document composition software. Further, the corresponding location made correspond to a file to be operated is configured as a logical location used for performing the classification etc. as to a document, that is, a folder (directory) or a trash box etc., for example. Hereinafter, the explanation will be mainly made as to a folder as an example of the first location and a trash box as an example of the second location. Thus, a file within the folder shows an example of the state where the management subject information is made correspond to the first location and a file within the trash box shows an example of the state where the management subject information is made correspond to the second location. Further, the movement of a file within the folder to the trash box shows an example of the change of the corresponding location made correspond to the management subject information to the second location from the first location. The trash box is used for deleting unnecessary files. When a file is moved into the trash box, although it is possible to take out and restore the file at this time, the file is actually deleted when an operation of "cleaning out the trash box" or "deleting from the trash box" is performed.

A utilizing person is an operating person, a user or a requesting person etc. in this exemplary embodiment according to the situation of the exemplary embodiment.

The explanation will be mainly made as to an access right as an operation right. Operation right information is information of operations permitted as to a file determined for each utilizing person. Thus, when a utilizing person has the operation right, the operation is permitted when the utilizing person tries to operate the file. The permitted operations include the reading, editing or writing etc. of a file, for example.

The example shown in FIG. 2 is a case where the information management system 100 is coupled to the communication line and so can be utilized by another information processing apparatus.

A client 210A, a client 210B etc. and a server 220A, a server 220B etc. are coupled via a network 291. In the example shown in FIG. 2, although the two clients 210 and the two servers 220 are provided, the number of each of the client and the server may be one or two or more. Of course, the number of the clients 210 and the number of the servers 220 may not coincide. Since the client 210A has the same module configuration as the client 210B and also the server 220A has the same module configuration as the server 220B, the following explanation will be made only as to the client 210A and the server 220A. Further, when applicable to any of the clients and any of the servers, the following explanation will be made merely by referring to the client 210 and the server 220.

The server 220A, the server 220B etc. and a reception modules 231 of a trash box server 230 are coupled via a network 292. In the example shown in FIG. 2, although the network 291 and the network 292 are provided separately, the aforesaid constituent elements may be coupled to a single communication line or a plurality of communication lines. Further, a plurality of the trash boxes may be provided.

The client 210A is a client device for instructing operations relating to the trash box to the server 220A. To be more concrete, this client accepts operations by a user for moving a file within the server 220A to the trash box, or restoring the file from the trash box, for example.

The server 220A includes a file restoration module 221A, a file deletion module 222A, a history management module 223A and a database 224A, and is a file management server for deleting and restoring a file and managing historical information in accordance with an instruction from the client 210A.

The file restoration module 221A restores a file within the server 220A.

The file deletion module 222A deletes a file within the server 220A (moves a file to a folder called the trash box).

The history management module 223A manages the historical information of files within the server 220A.

The database 224A manages files and data within the server 220A.

The trash box server 230 includes a reception modules 231, a processing distribution module 232, a reservation module 233, a restoration module 234, a discard module 235, a list module 236, a database 237 and a history management modules 240, and is a server for collectively managing files deleted from a plurality of the servers 220.

The reception modules 231 is coupled to the processing distribution module 232 and also coupled to the server 220A etc. via the network 292. The reception module receives operations relating to the trash box from the server 220 and sends the received operations to the processing distribution module 232.

The processing distribution module 232 is coupled to the reception modules 231, the reservation module 233, the restoration module 234, the discard module 235, the list module 236 and the history management modules 240. The processing distribution module distributes the operations from the reception modules 231 and sends the distributed operations to the history management modules 240, the reservation module 233, the restoration module 234, the discard module 235 and the list module 236.

The reservation module 233 is coupled to the processing distribution module 232 and the database 237 and reserves files in the database 237 within the trash box server 230 in accordance with the operation received from the processing distribution module 232. The reservation of files is accorded to the operation for moving the files to the trash box.

The restoration module 234 is coupled to the processing distribution module 232 and the database 237 and restores files from the database 237 within the trash box server 230 in accordance with the operation received from the processing distribution module 232. The restoration of files is accorded to the operation for taking out the files within the trash box.

The discard module 235 is coupled to the processing distribution module 232 and the database 237 and discards (deletes) files from the database 237 within the trash box server 230 in accordance with the operation received from the processing distribution module 232.

The list module 236 is coupled to the processing distribution module 232 and the database 237 and generates information for glancing files of the database 237 within the trash box server 230 in accordance with the operation received from the processing distribution module 232 and sends the information to the server 220 requesting the information. The information for glancing is sent to the client 210 from the server 220 and displayed on a display provided at the client 210, for example.

The database 237 is accessed from the reservation module 233, the restoration module 234, the discard module 235, the list module 236 and a history operation module 241 and a retrieval module 242 within the history management modules 240. This database manages files and data moved to the trash box within the trash box server 230.

The history management modules 240 includes the history operation module 241 and the retrieval module 242 and manages the historical information of files within the trash box server 230 in accordance with the operation received from the processing distribution module 232.

The history operation module 241 is coupled to the database 237 and the retrieval module 242 and performs the processings relating to the history such as the storage, deletion, composition (merge) of the historical information of files by using the database 237 within the trash box server 230.

The retrieval module 242 is coupled to the database 237 and the history operation module 241 and retrieves whether or not there is a file of the same contents in the database 237 within the trash box server 230.

As to the correspondence to the modules exemplarily shown in FIG. 1, mainly, the module 111 corresponds to the database 237, the first change module 155 corresponds to the reservation module 233, the second change module 160 corresponds to the restoration module 234, the first deletion module 165 corresponds to the discard module 235, the history operation module 241 and the retrieval module 242, the second deletion module 170 corresponds to the history operation module 241, the management subject information storage capacity confirmation module 175 corresponds to the history operation module 241, the output module 180 corresponds to the list module 236, the notification module 185 corresponds to the history operation module 241, and the control module 190 corresponds to the reception modules 231 and the processing distribution module 232.

Figure 3:
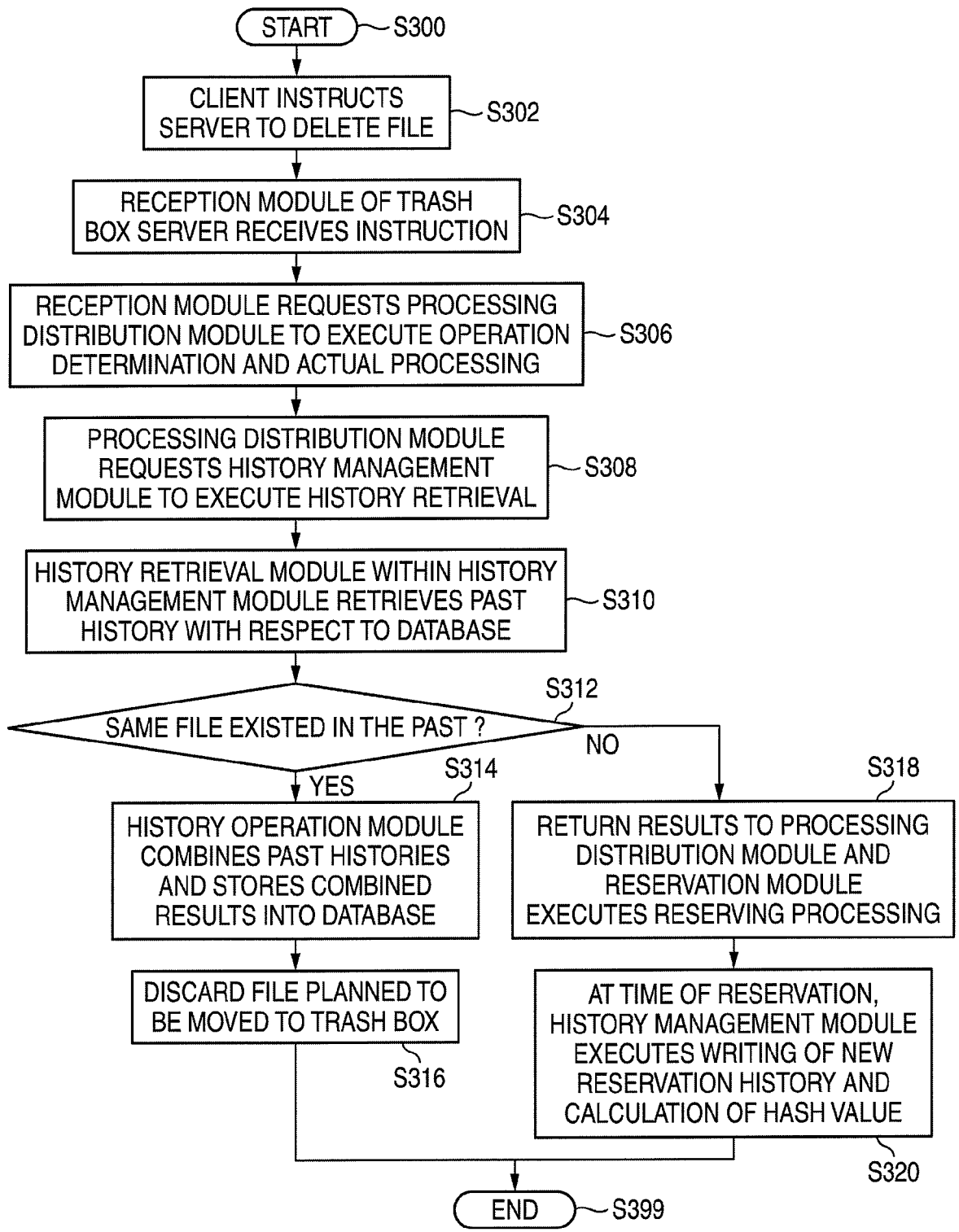
FIG. 3 is a flowchart showing an example of the moving processing to a trash box according to the exemplary embodiment.

FIG. 3 is a flowchart showing an example of the moving processing to the trash box according to the exemplary embodiment.

In step S302, the client 210 instructs a designated file within the server 220 to be moved into the trash box in accordance with the operation of a user.

In step S304, the reception modules 231 accepts the moving instruction to the trash box from the server 220.

In step S306, the reception modules 231 requests the processing distribution module 232 as to the moving processing to the trash box.

In step S308, the processing distribution module 232 instructs the history management modules 240 to confirm whether or not the same file has been moved to the trash box.

In step S310, the retrieval module 242 within the history management modules 240 executes a retrieval with respect to the database 237 within the trash box server 230 as to whether or not a file same as that now rendered to be moved to the trash box exists within the database 237.

In step S312, the processing is branched in accordance with the retrieval results in step S310. When the same file exists within the database 237 (Yes), the processing proceeds to step S314, whilst when not exist (No), the processing proceeds to step S318.

In step S314, the history operation module 241 within the history management modules 240 combines (associates) past historical information and the historical information of the file now rendered to be moved to the trash box and stores the historical information thus combined in the database 237.

In step S316, the history management modules 240 discards (deletes) the file planned to be moved to the trash box.

In step S318, the history operation module 241 within the history management modules 240 returns the retrieval results of step S310 to the processing distribution module 232, whereby the reservation module 233 executes the reserving processing of the file.

In step S320, when the reservation module 233 reserves the file in the database 237, the history management modules 240 executes the calculation a hash value necessary at the time of writing the historical information to be newly reserved in the database 237 and the retrieval of the database. The hash value is used in order to determine whether or not the contents of files are same, and the details thereof will be explained later.

Figure 4:
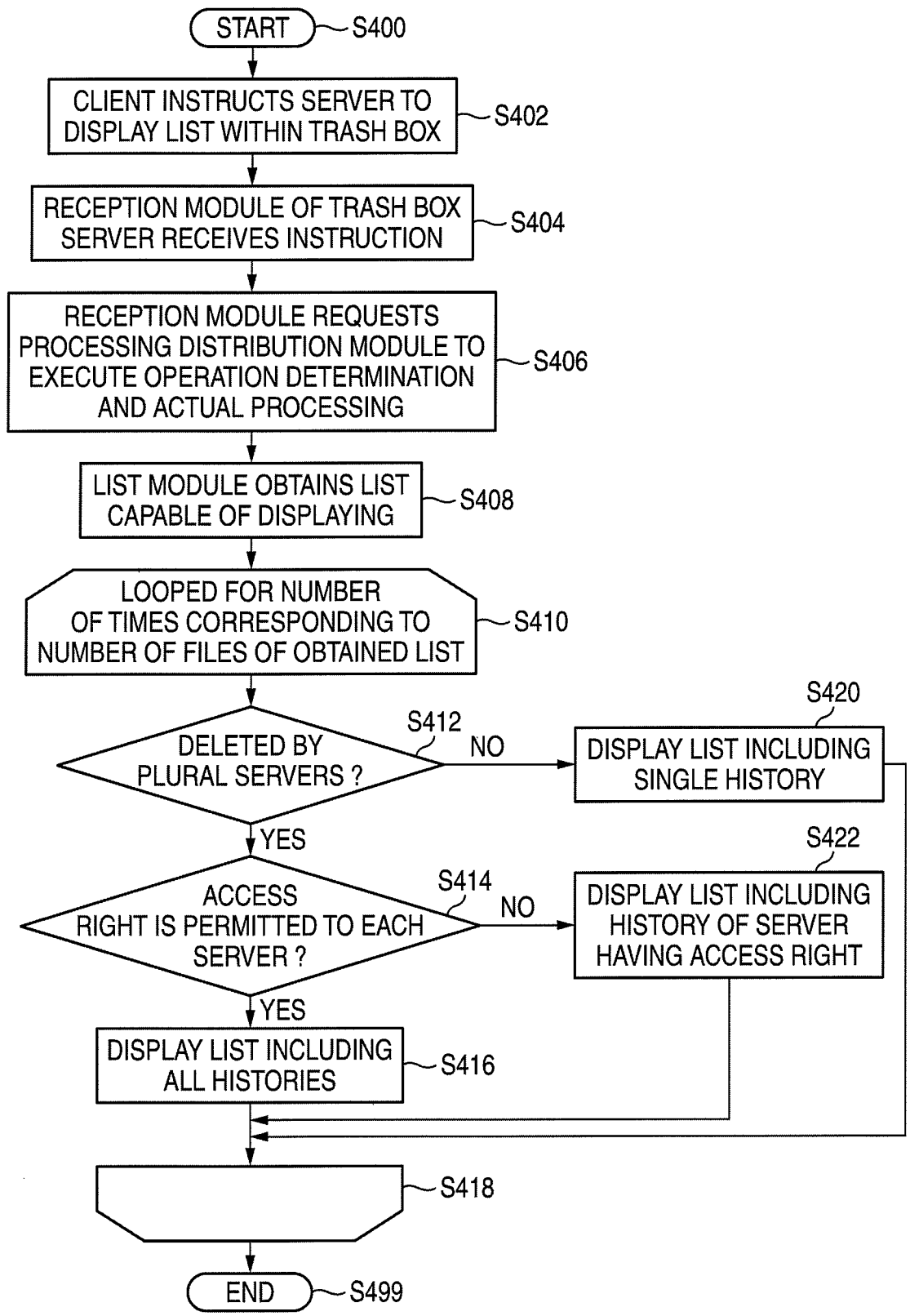
FIG. 4 is a flowchart showing an example of the processing of displaying the list of files within the trash box according to the exemplary embodiment.

FIG. 4 is a flowchart showing an example of the processing of displaying the list of files within the trash box according to the exemplary embodiment.

In step S402, in accordance with the operation of a user, the client 210 instructs the server 220 to display a list of files within the trash box.

In step S404, the reception modules 231 receives the instruction of displaying the list of the files within the trash box from the server 220.

In step S406, the reception modules 231 requests the processing distribution module 232 to perform the listing processing of the files within the trash box.

In step S408, the list module 236 requested from the processing distribution module 232 obtains a list capable of displaying from the database 237.

The processings from step S410 to step S418 (step S420 and step S422 may be contained in some cases) are repeatedly executed as a loop by a number of times corresponding to the number of the files of the list. In this loop, it is confirmed at every file within the list whether or not there is historical information of another server 220. In this case, the display of the list is limited as to a file within another server 220 to which an access right is not permitted. The historical information only capable of being displayed is obtained and displayed as a list.

In step S412, the list module 236 determines whether or not a subject file to be displayed is a file deleted (mobbed to the trash box) by the plural servers 220. This determination is made by using the historical information held in the database 237. Alternatively, the list module 236 may perform the determination by using history management modules 240. When the subject file to be displayed is a file deleted by the plural servers 220 (Yes), the processing proceeds to step S414, whilst when the file to be displayed is not a file deleted by the plural servers (No), the processing proceeds to step S420.

In step S414, the list module 236 determines whether or not a user who instructed the display of the list of files within the trash box has an access right with respect to the respective servers 200 which deleted the subject files. When the user has the access right (Yes), the processing proceeds to step S416, whilst when the user has not the access right (No), the processing proceeds to step S422.

In step S416, the list module 236 generates a list of the historical information of the subject files so as to be displayed. Then, the list module transmits the list to the server 220 instructing the display and also to the client 210, whereby the client 210 displays the list on a display etc.

In step S420, the list module 236 generates a list of the single historical information of the subject files (historical information of the server 220 instructing the display) so as to be displayed. Then, the list module transmits the list to the server 220 instructing the display and also to the client 210, whereby the client 210 displays the list on the display etc.

In step S422, the list module 236 generates a list of the historical information of the server 220 having the access right with respect to the subject files. Then, the list module transmits the list to the server 220 instructing the display and also to the client 210, whereby the client 210 displays the list on a display etc.

Figure 5:
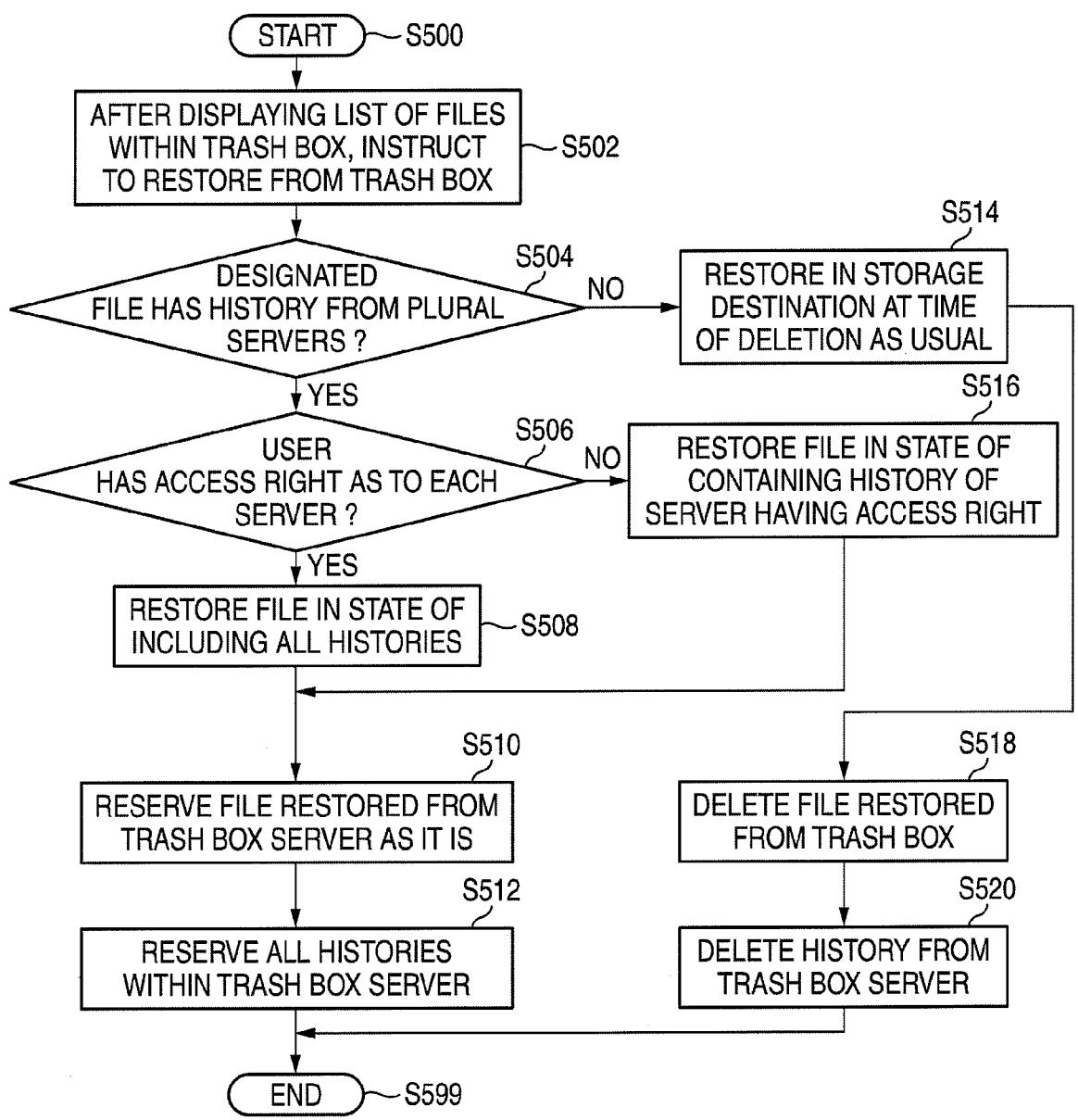
FIG. 5 is a flowchart showing an example of the restoring processing of a file from the trash box according to the exemplary embodiment.

FIG. 5 is a flowchart showing an example of the restoring processing of a file from the trash box according to the exemplary embodiment. This processing example is performed in a state that the list of the files within the trash box is displayed as shown in the example of FIG. 4.

In step S502, in accordance with the operation of a user, the client 210 instructs the server 220 to restore a file within the trash box of the trash box server 230. Then, when the reception modules 231 receives the restoration instruction from the server 220, the processing distribution module 232 requests the restoration module 234 to perform the restoration processing.

In step S504, the restoration module 234 determines whether or not the designated file thus requested for restoration has historical information from a plurality of the servers. When it is determined to have (Yes), the processing proceeds to step S508, whilst when it is determined not to have (No or when the file is deleted from the single server 220), the processing proceeds to step S514.

In step S506, the restoration module 234 determines whether or not the user instructed the restoration processing has the access right with respect to the respective servers 220 having deleted the designated file. When it is determined that the user has the access right (Yes), the processing proceeds to step S508, whilst when it is determined that the user does not have the access right (No), the processing proceeds to step S516

In step S508, the restoration module 234 takes out the designated file from the database 237 and sends the file to the sever 220 instructed the restoration so that the file can be restored in a state of containing all the historical information of the designated file.

In step S510, the restored designated file is reserved in the database 237 as it is without being deleted from the database 237.

In step S512, the historical information made correspond to the restored designated file is also reserved in the database 237 as it is without being deleted from the database 237 like step S510.

In step S514, the restoration module 234 takes out the designated file from the database 237 and sends the file to the sever 220 instructed the restoration so that the file can be restored in a storage destination at the time of deleting the designated file. The file may be restored in a state of containing the historical information.

In step S516, the restoration module 234 takes out the designated file from the database 237 and sends the file to the sever 220 instructed the restoration so that the file can be restored in a state of containing the historical information by the server 220 having the access right as to the designated file.

In step S518, the discard module 235 deletes the restored designated file from the database 237.

In step S520, the history operation module 241 within the history management modules 240 deletes the historical information of the restored designated file from the database 237.

The expression "to restore the file in a state of containing the historical information" indicates restoring the file in a state of adding the historical information managed by the trash box server 230. In each of the servers where the file is restored, the historical information can be used. For example, in the case of moving the file again to the trash box server 230 thereafter, the historical information after the restoration from the trash box server 230 may be added to the historical information added to the file to thereby update the historical information.

In each of step S510 and S512, the file is stored as it is. This is because in the case where a file corresponds to the historical information of a plurality of the servers at the time of performing the restoration processing of the file from the trash box server 230, when the file and the historical information are deleted from the trash box server 230, it becomes impossible to refer from the other servers 220. Thus, the file is not deleted. However, in order to reduce files to be reserved in the database 237, the following processing ((1) to (3)) may be selectively performed.

(1) When a reservation period reaches a predetermined time period, the file and the historical information thereof are deleted.

(2) In a view point of the management of record, the file is backed up by another recording medium. That is, the deleting processing is not performed.

(3) Since the data within the database 237 is once deleted, when the file is moved to the server 220 of the restoration destination, the file and the historical information within the database 237 are deleted. When the restoration instruction is issued from another one of the servers 220, the file may be taken out from the server 220 of the restoration destination.

Hereinafter, as concrete examples of the processing, the explanation will be made as to "an example of the processing of moving a file to the trash box server 230", "an example of the processing of moving a file of the same contents to the trash box server 230 from another server 220", "an example of the processing of restoring a file having plural histories from the trash box server 230", "an example of the processing of storing a file of the same contents as a file within the trash box server 230 into the server 220", and "an example of the processing of notifying a file to be deleted to a user".

Figure 6:
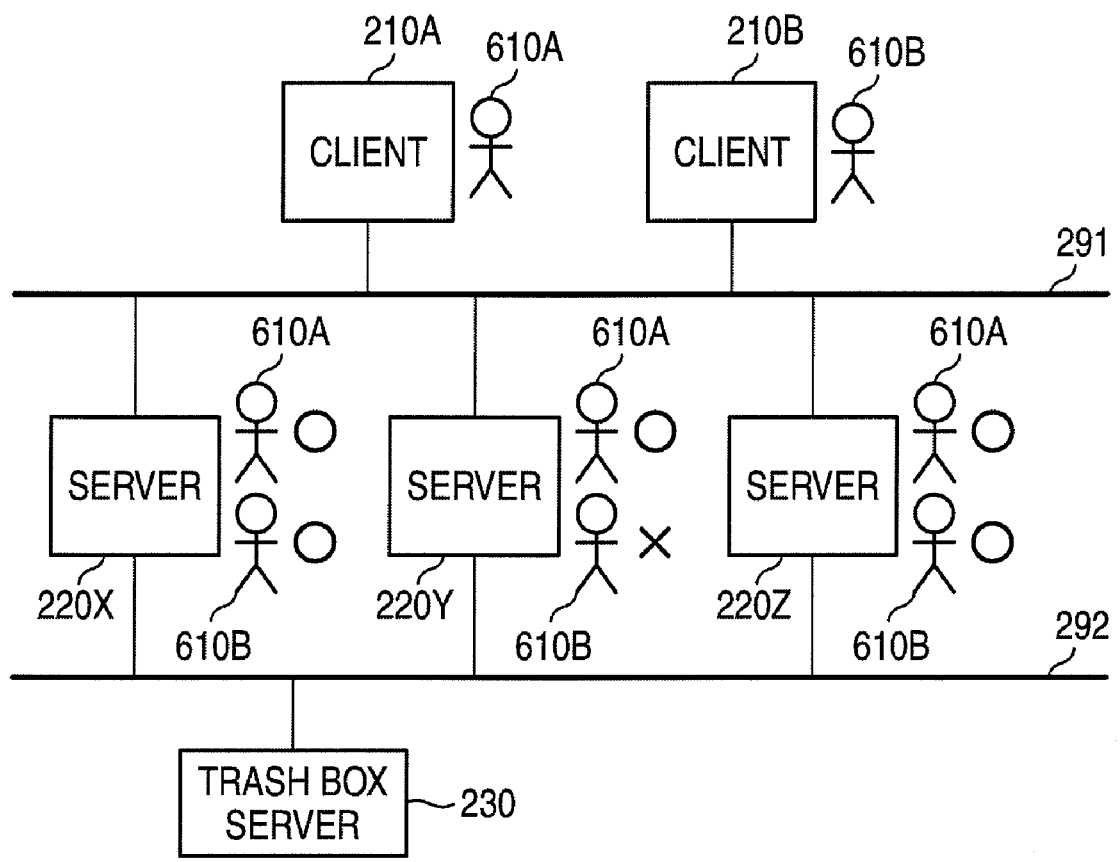
FIG. 6 is a diagram for explaining an example of the concrete system configuration in order to explain the exemplary embodiment.

FIG. 6 is a diagram for explaining an example of the concrete system configuration in order to explain the exemplary embodiment. As shown in the example of FIG. 6, the system includes three servers, that is, a server 220X, a server 220Y and a server 220Z, the trash box server 230, the client 210A used by a user 610A, and the client 210B used by a user 610B, wherein these constituent elements are coupled to each other via the network 291 and the network 292 so as to be able to communicate from one another.

In this case, it is supposed that the access right is set at every server in a manner that the user 610A can access to all the servers (shown by ○ in the example of FIG. 6), and the user 610B is provided with the access right as to the server 220X and the server 220Z but not provided with the access right as to the server 220Y (shown by x in the example of FIG. 6).

Further, two files "Report" of the same contents planned to be moved to the trash box (trash box server 230) are stored in each of the server 220X and the server 220Y. The file "Report" is prepared within the server 220X, then the file is edited for plural number of times by the user 610A and the user 610B, then the file is developed (to be concrete, placed in a state of being accessible also by a user P, a user Q and a user R each being a task member), and the file is opened to the server 220Y by the user 610A having the authority with respect to the server 220Y. Each of the other users P, Q and R performs the download within the server 220Y and so it is planned to move to the trash box. These historical information are made correspond to the file "Report" within the server 220X as a history table 700 and to the file "Report" within the server 220Y as a history table 800. The history table 700 and the history table 800 are managed by the history management modules 223 within the server 220X and the server 220Y, respectively. The task is an application program for performing a single jog or plural jobs by plural members, and, to be concrete, configured by a computer program for sharing a file or managing a schedule, etc.

Figure 7:
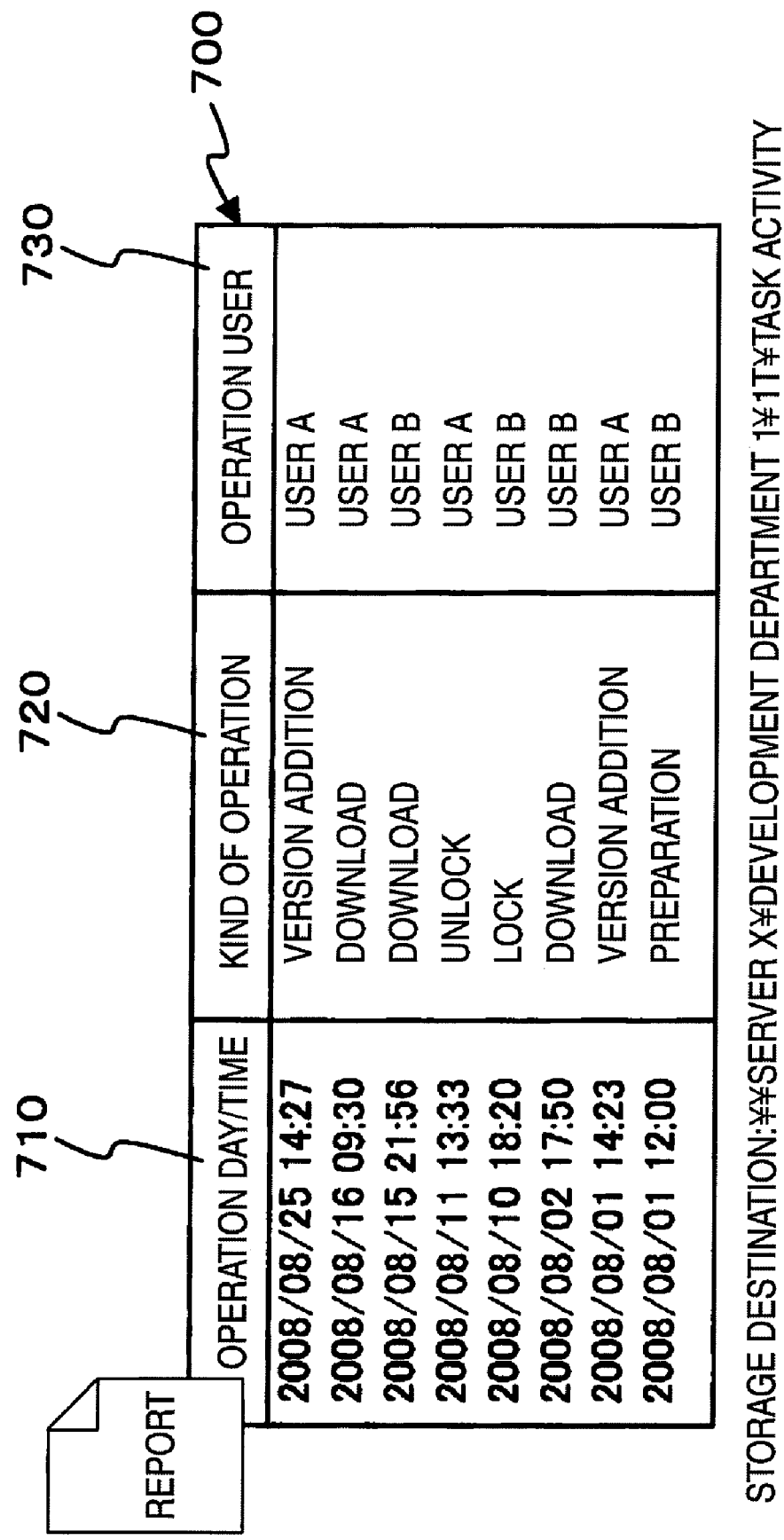
FIG. 7 is a diagram for explaining an example of the data structure of a history table.

FIG. 7 is a diagram for explaining an example of the data structure of the history table 700. The history table 700 is made correspond to the file "Report" within the server 220X.

The history table 700 includes an operation day/time column 710, a kind of operation column 720 and an operation user column 730.

The operation day/time column 710 stores day and time (one of year, day, time, minute, second etc. or the combination thereof, hereinafter the day/time is defined in the same manner) of the operation performed as to the file "Report" within the server 220X.

The kind of operation column 720 stores the kind of the operation performed with respect to the file.

The operation user column 730 stores the name of a user who performed the operation.

The processing is performed based on the operation by a user with respect to the client 210 and the historical information thereof is stored in correspondence to the file to be operated.

Figure 8:
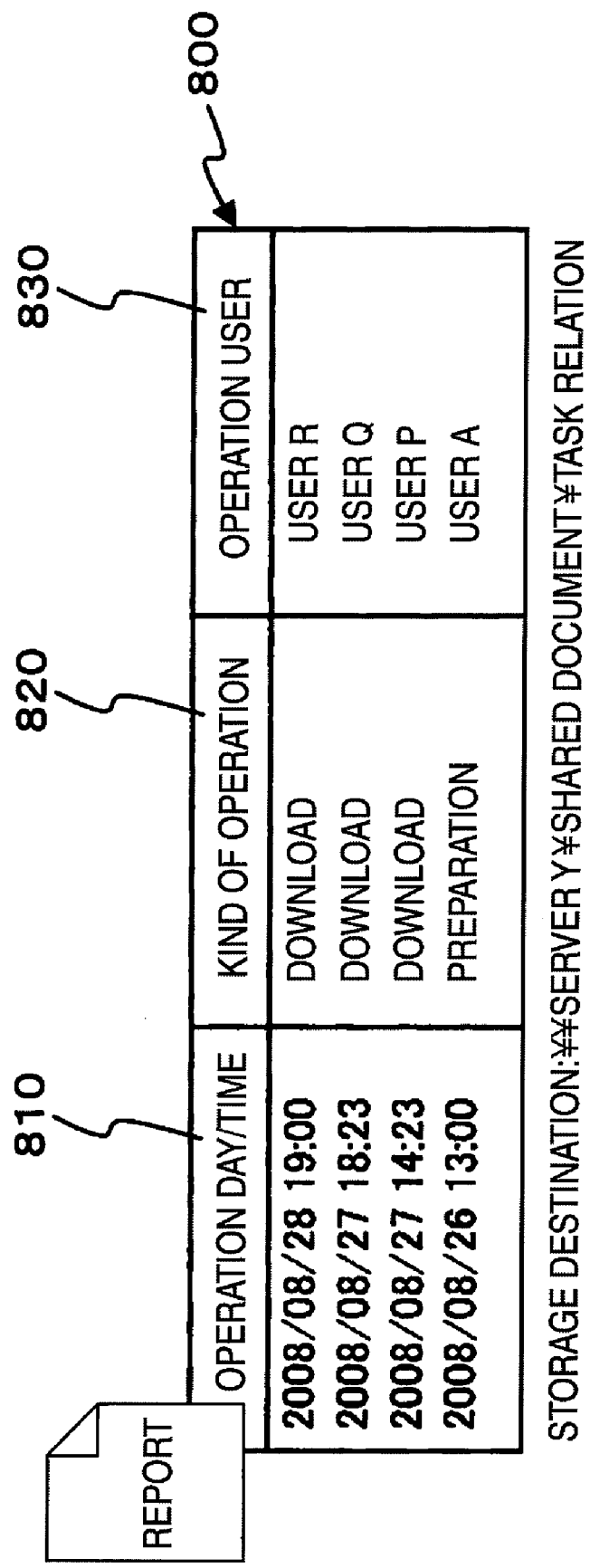
FIG. 8 is a diagram for explaining an example of the data structure of the history table.

FIG. 8 is a diagram for explaining an example of the data structure of the history table 800. The history table 800 is made correspond to the file "Report" within the server 220Y.

The history table 800 has the similar data structure as that of the history table 700.

Under such the circumstance, the explanation will be made as to "an example of the processing of moving a file to the trash box server 230". That is, the explanation will be made as to an example of the processing of moving the subject file "Report" within the server 220X in accordance with the operation of the user 610A performed as to the client 210A.

Figure 9:
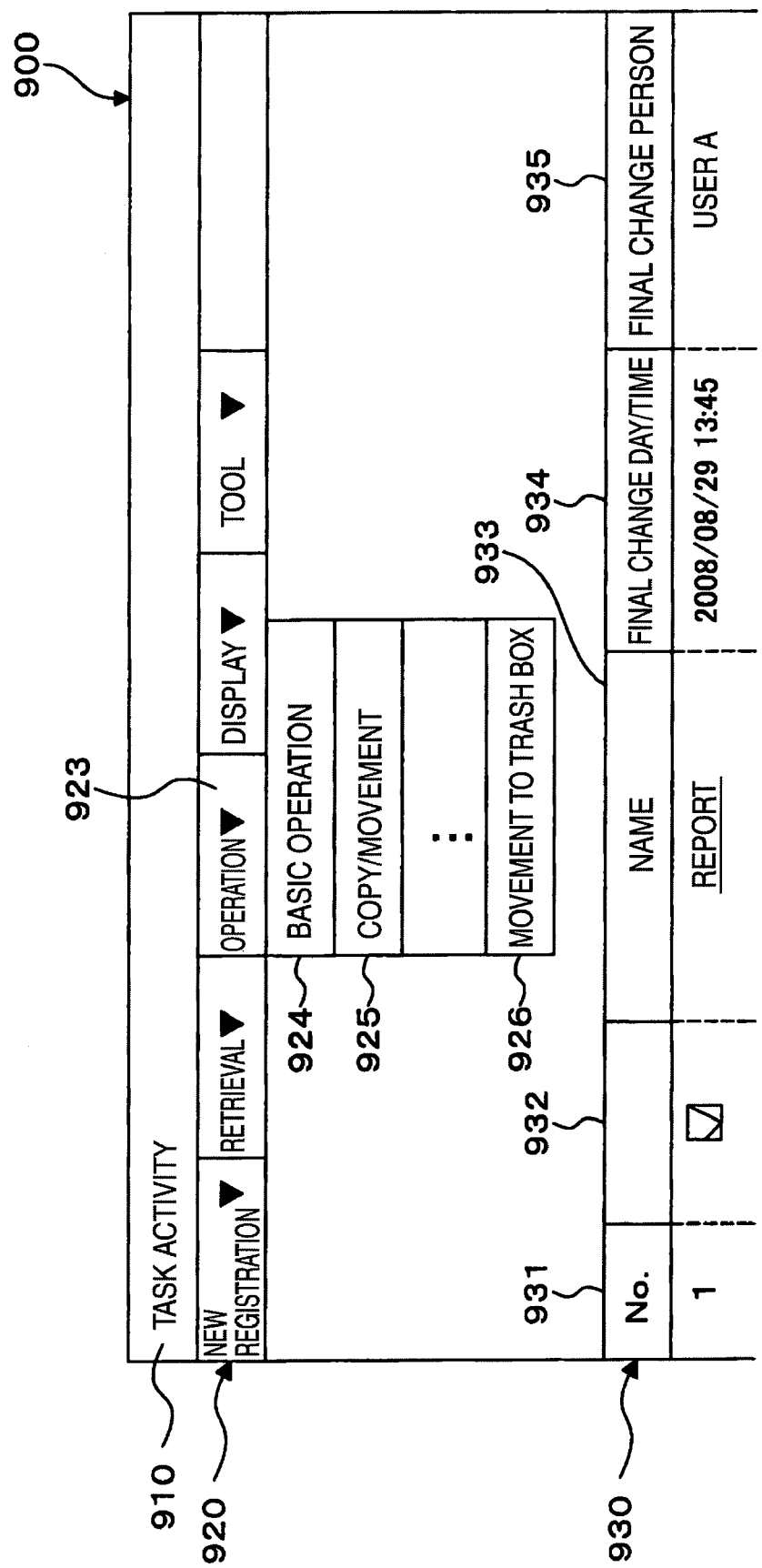
FIG. 9 is an explanatory diagram showing an example of the display of a file operation screen.

FIG. 9 is an explanatory diagram showing an example of the display of the file operation screen 900 of the display of the client 210A. The file operation screen 900 is a screen for operating a file within the server 200X.

The file operation screen 900 includes a storage destination folder name display area 910, an operation area 920 and a file display area 930.

The storage destination folder name display area 910 displays a task name to which the user 610A is added as a member. The task is managed by the server 220X.

The operation area 920 displays operations capable of being selected for the task. For example, when an operation column 923 as to a file is selected, a basic operation column 924, a copy/movement column 925 and a movement to trash box column 926, etc. are displayed.

The file display area 930 displays a list of files managed by the task. The file display area 930 includes a No. column 931, a check column 932, a name column 933, a final change day/time column 934 and a final change person column 935.

The No. column 931 displays a number capable of uniquely identifying the file managed by the task.

The check column 932 shows a state selected by a user (checked state) and represents that the operation is performed as to the file.

The name column 933 displays the name of the file.

The final change day/time column 934 displays the final change day/time of the file.

The final change person column 935 displays a user who performed the change at the day/time of the final change day/time column 934.

In order to move the report to the trash box from the server 220X, the user 610A operates to check the check column 932 of the object file "Report" (No. 1) and selects the movement to trash box column 926 of the operation column 923.

When the moving operation to the trash box is performed, the file "Report" on the server 220X is moved to the trash box server 230 and deleted from the server 220X. According to the processing in the flowchart shown as example in FIG. 3, since there is no history that the file of the same contents has been deleted in the past, the reservation module 233 newly executes the reserving processing to the database 237 (step S318).

Figure 10:
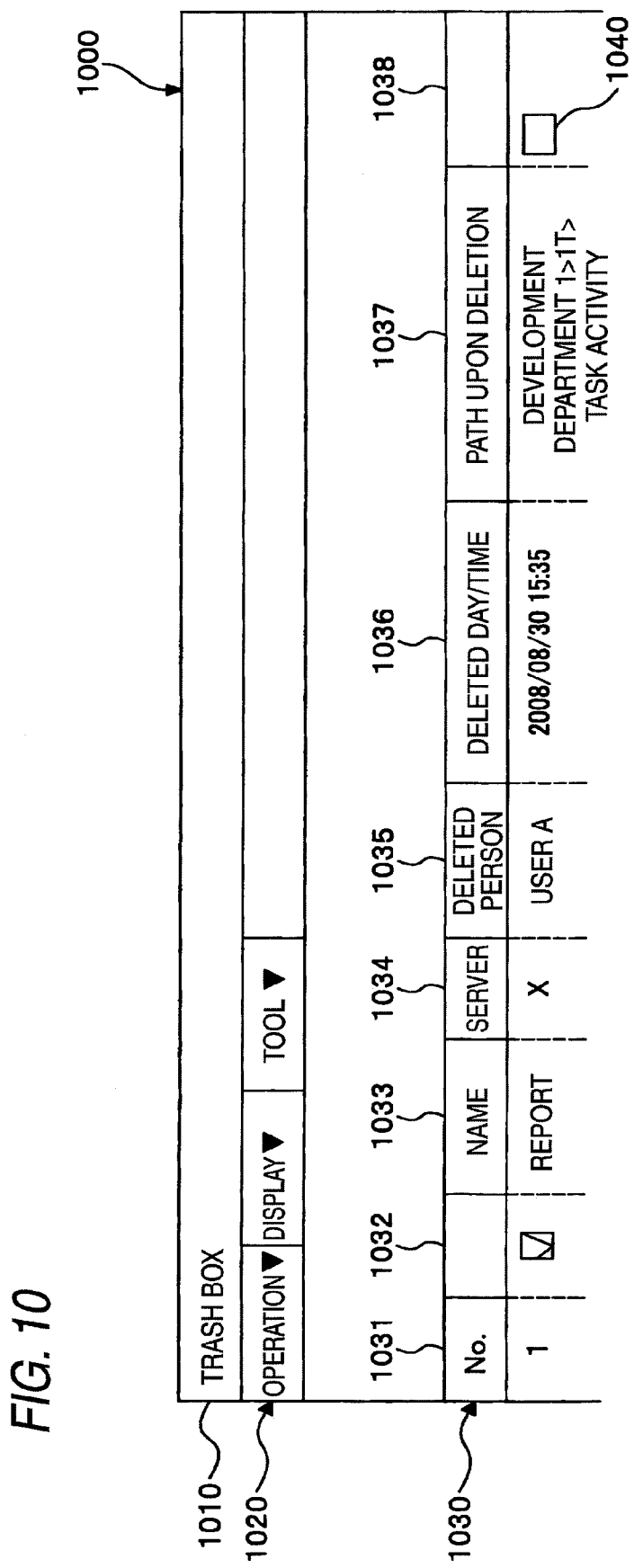
FIG. 10 is an explanatory diagram showing an example of the display of a trash box file list screen.

After the file is moved to the trash box, when it is instructed to display the list within the trash box, a trash box file list screen 1000 shown as an example in FIG. 10 is displayed. FIG. 10 is an explanatory diagram showing an example of the display of the trash box file list screen 1000. The trash box file list screen 1000 includes a storage destination folder name display area 1010, an operation area 1020 and a file display area 1030.

The storage destination folder name display area 1010 displays that the list of the files displayed on the file display area 1030 exists within the trash box.

The operation area 1020 is substantially same as the operation area 920 shown as the example in FIG. 9.

The file display area 1030 displays the list of the files managed by the trash box and includes a No. column 1031, a check column 1032, a name column 1033, a server column 1034, a deleted person column 1035, a deleted day/time column 1036, a path upon deletion column 1037, a related information display column 1038.

The No. column 1031 displays a number capable of uniquely identifying the file within the trash box.

The check column 1032 shows a state selected by a user (checked state) and represents that the operation is performed as to the file.

The name column 1033 displays the name of the file.

The server column 1034 displays the server which moved the file to the trash box. The server 220X corresponds to such the server in this case.

The deleted person column 1035 displays a user who performed the deletion operation (moving operation to the trash box) of the file. The user 610A corresponds to such the user in this case.

The deleted day/time column 1036 displays the deleted day/time of the file (moving day/time to the trash box).

The path upon deletion column 1037 displays a path at the time of deleting the file (the storage location where the file exists at the time of moving to the trash box).

The related information display column 1038 displays an icon for displaying the information relating to the file. For example, the related information display column 1038 displays a history display icon 1040. When one of these icons is selected by the operation of a user, the information relating to the selected icon is displayed.

When the history display icon 1040 on the trash box file list screen 1000 is selected by the operation of a user, a history display screen 1100 of the file "Report" shown as the example in FIG. 11 is displayed. FIG. 11 is an explanatory diagram showing an example of the display of the history display screen 1100.

The history display screen 1100 includes a storage destination folder name display area 1110, a history display (report) 1120 and a file display area 1130.

The storage destination folder name display area 1110 displays that the list of the histories of the subject files displayed on the file display area 1130 exists within the trash box.

The history display (report) 1120 displays that the histories are displayed and the subject file name is displayed. In this case, "History display (Report)" is displayed.

The file display area 1130 displays the list of the histories of the subject file. The file display area 1130 includes a server name column 1131, an operation day/time column 1132, an operation kind column 1133 and an operation user column 1134.

The server name column 1131 displays the server 220 subjected to the operation.

The operation day/time column 1132 displays the day/time where the operation is performed.

The operation kind column 1133 displays the kind of the operation.

The operation user column 1134 displays the user 610 who performed the operation.

The historical information stored in the database 237 for displaying the trash box file list screen 1000 and the history display screen 1100 are stored as a history table 1200 and a history management table 1300, respectively.

FIG. 12 is an explanatory diagram showing an example of the data structure of the history table 1200. This data is mainly used for displaying the trash box file list screen 1000.

The history table 1200 includes a number column 1201, a name column 1202, a deleted person column 1203, a deleted day/time column 1204, a server column 1205, a path upon deletion column 1206, a history ID column 1207 and a hash value column 1208.

The number column 1201 displays a number capable of uniquely identifying the file within the trash box.

The name column 1202 stores the name of the file.

The deleted person column 1203 stores the name of the user 610A who performed the deletion operation (moving operation to the trash box) of the file.

The deleted day/time column 1204 stores the deleted day/time of the file (moving day/time to the trash box).

The server column 1205 stores the name of the server 220 which moved the file to the trash box.

The path upon deletion column 1206 stores a path at the time of deleting the file (the storage location where the file exists at the time of moving to the trash box).

The history ID column 1207 stores a number capable of uniquely identifying the historical information made correspond to the file. This column corresponds to the history ID column 1301 within the history management table 1300 explained next.

The hash value column 1208 stores a hash value of the contents of the file.

The history table 1200 is mainly added with the server column 1205 and the hash value column 1208 in addition to the historical information (file name, deleted person, deleted day/time and path upon deletion) on the origin server 220. The hash value is referred at the time of the retrieval or the restoration.

FIG. 13 is an explanatory diagram showing an example of the data structure of the history management table 1300. This data is mainly used for displaying the history display screen 1100.

The history management table 1300 includes the history ID column 1301, a server column 1302, an operation day/time column 1303, an operation kind column 1304 and an operation user column 1305.

The history ID column 1301 stores a number capable of uniquely identifying the historical information of the file. This column corresponds to the history ID column 1207 within the history table 1200 explained above. That is, plural historical information having the same history ID represent the operations performed as to the same file.

The server column 1302 stores the name of the server 220 as to which the operation is performed.

The operation day/time column 1303 stores the day/time where the operation is performed.

The operation kind column 1304 stores the kind of the operation.

The operation user column 1305 stores the name of the user 610 who performed the operation.

Next, the explanation will be made as to "an example of the processing of moving a file of the same contents to the trash box server 230 from another server 220". That is, the explanation is made as to the case where the file having the same contents as that of the file already deleted from the server 220X is deleted from the server 220Y.

According to the processing of the flowchart shown as an example in FIG. 3, when the file of the same contents exists within the database 237 within the trash box server 230 (Yes in step S312), only the combining of the historical information is executed and the file itself deleted at this time is discarded without being stored in the database 237.

The history table 1200 within the trash box server 230 shown as an example in FIG. 12 is updated like the history table 1200 shown as an example in FIG. 14. In this case, since the hash value within the hash value column 1208 of the file already deleted (first line of the history table 1200) is same as that of the file deleted at this time (second line of the history table 1200), these files are displayed as a single file as the file list within the trash box. Although there are various kinds of display formats, according to this exemplary embodiment, in the case of a file having a plurality of restoration sources, the server name may be selectively changed by using a pull-down menu as shown by a server switch display column 1534 within a server column 1034 shown as an example in FIG. 15. That is, by selecting the server name in accordance with the operation of a user, the contents such as the deleted person column 1035 and the deleted day/time column 1036 of the file deleted from the server thus selected is displayed in a switched manner.

Figure 16:
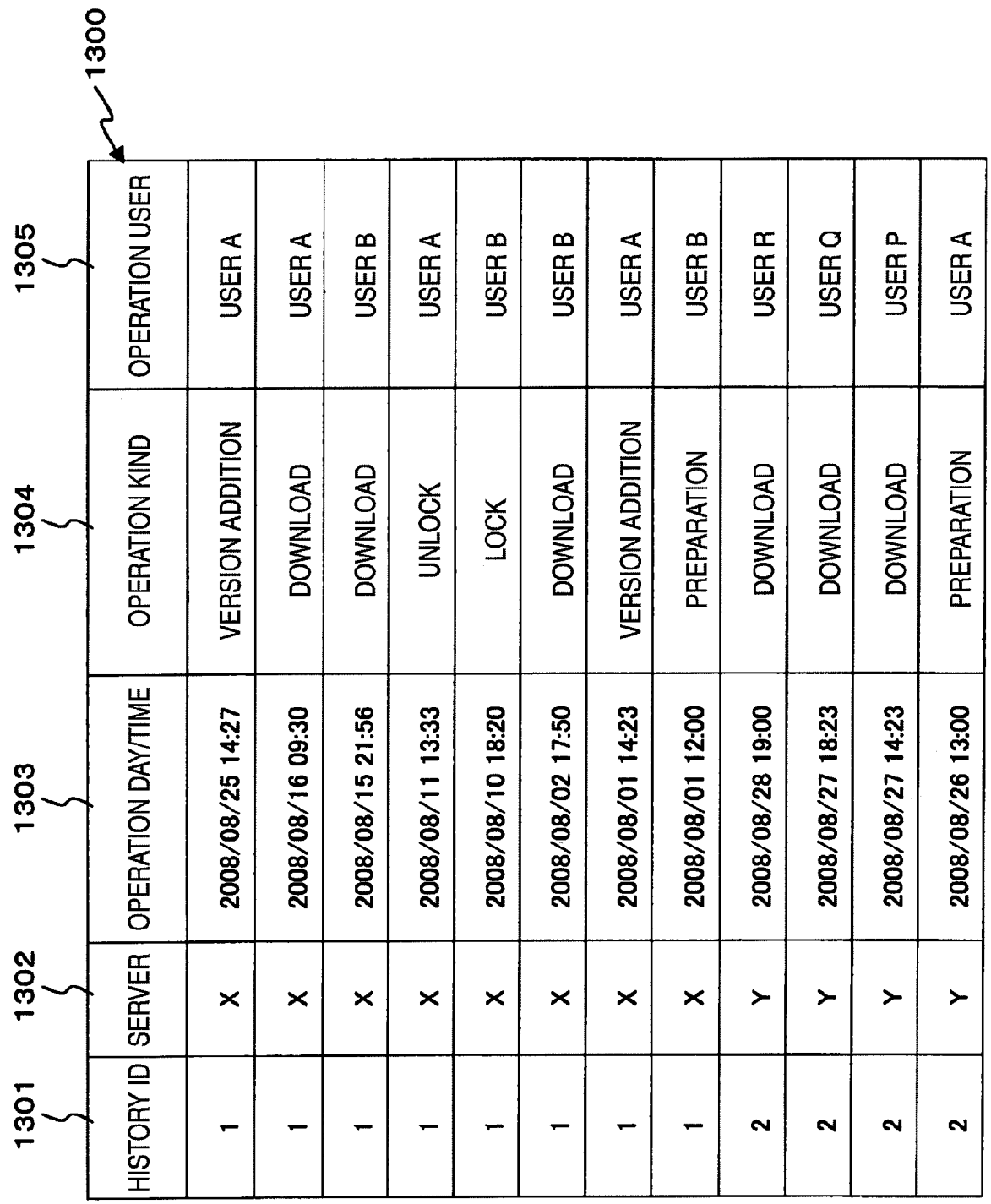
FIG. 16 is an explanatory diagram showing an example of the data structure of the history management table after the update.

A new line is added to the history management table 1300 shown as an example in FIG. 13 to thereby update this table. FIG. 16 is an explanatory diagram showing an example of the data structure of the history management table 1300 after the update. In this case, historical information of four lines corresponding to the history ID "2" is added to the history management table 1300 shown as an example in FIG. 13.

Figure 15:
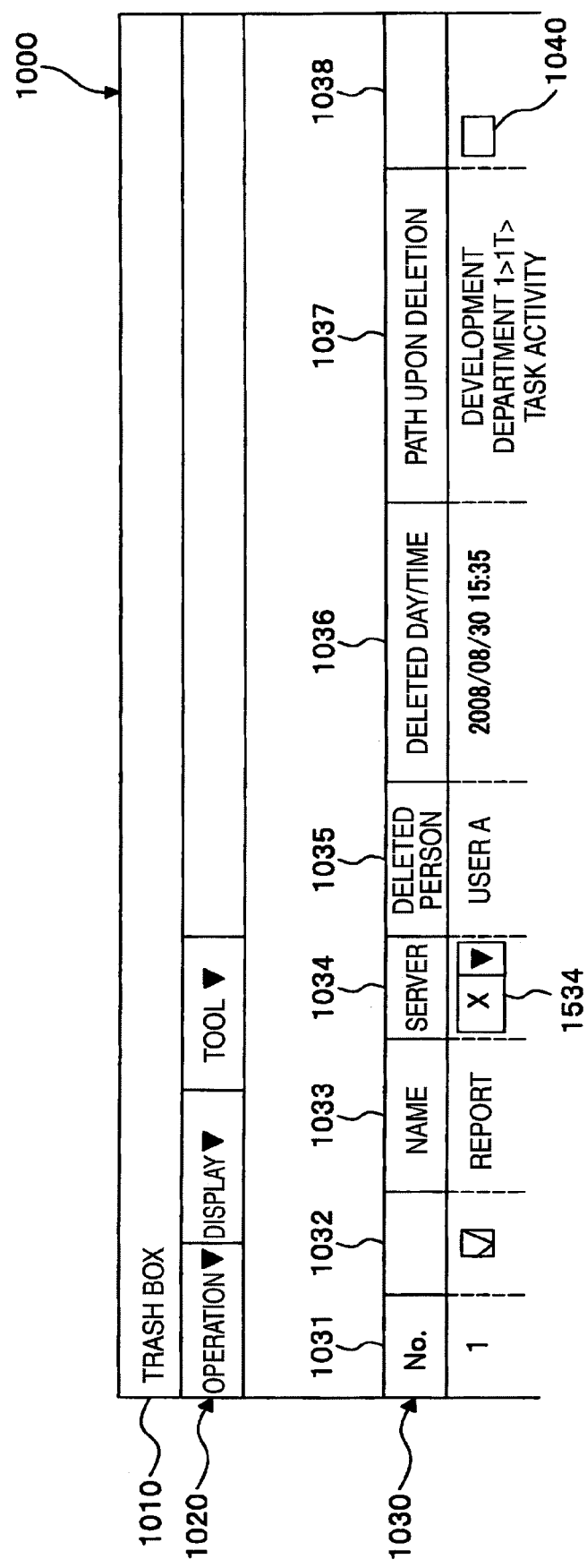
FIG. 15 is an explanatory diagram showing another example of the display of the trash box file list screen.

In the case where the user 610B having no access right as to the server 220Y displays the trash box file list screen 1000, the server switch display column 1534 shown as an example in FIG. 15 is not displayed but it is permitted only to refer to the historical information deleted from the server 220X (that is, the historical information of the file deleted from the server having the access right) shown as an example in FIG. 10.

Next, the explanation will be made as to "an example of the processing of restoring a file having plural histories from the trash box server 230". That is, the explanation is made as to the case where the file is restored after performing "an example of the processing of moving a file of the same contents to the trash box server 230 from another server 220".

As a case of restoring a file from the trash box server 230, there may be the restoring operation by the user 610A and the user 610B as the aforesaid example. According to the processing of the flowchart shown as an example in FIG. 5, when there is the historical information from only one server, after restoring the file, the file and the history are completely deleted from the trash box server 230.

However, as to the file to which the historical information of a plurality of the servers 220 is made correspond, when the file and the historical information is deleted, even if the restoration is performed as to any of them, the file within the trash box server 230 as the reference destination disappears with respect to the server 220 having not been subjected to the restoration processing. Thus, in the case of restoring the file to which plural historical information are made correspond, the file and the historical information are reserved without being deleted.

First, the explanation will be made as to the case where the user 610A restores the file "Report". As to the user 610A, the file "Report" deleted from the server 220X and the server 220Y as the "Report" within the trash box server 230 is displayed on the trash box file list screen 1000 (see the trash box file list screen 1000 shown in FIG. 15). The file "Report" is restored in the server 220 as the restoration destination by making correspond the historical information of the two servers 220.

The treatment of the history thus restored will be explained later.

Next. the explanation will be made as to a case where the user 610B restores the file "Report".

As to the user 610B, only the file "Report" deleted from the server 220X is displayed on the trash box file list screen 1000 as the "Report" within the trash box server 230 (see the trash box file list screen 1000 shown in FIG. 10). Thus, the user 610B executes the operation of "restoring a file moved to the trash box server 230 from the server 220X in the server 220X (by only the history within the server 220X).

In other words, the file is restored in the restoration destination where the file is stored at the time of deleting the file "Report" containing the history of the server 220X. In this case, the data within the trash box server 230 is reserved as it is.

The explanation will be made as to how the historical information restored from the trash box server 230 is treated in the respective servers 220.

The historical information includes a server name, operation day/time, kind of operation, name of operation user etc. as the historical information in each of the servers 220. The treatment of these information depends on the specification of the server 220 as the restoration destination. For example, when one of the servers 220 commonly treats the same user with another of the servers 220, the display/non-display may be set on a user unit basis in accordance with the access right. Further, the one server 220 may perfume the restoration in a manner that the historical information of the one server 220 is held whilst deleting the historical information of another server 220 by recognizing that the historical information of the another server 220 is irrelevant. In the one server 220, even if the user or the operation is unknown, such the user or the operation may be displayed as it is.

Next, the explanation will be made as to the case where a restored file is newly moved to the trash box server 230. With respect to the trash box server 230, when there is historical information reserved in the past, the update of the history management table 1300 is performed by the history operation module 241 as shown as an example in FIG. 17. FIG. 17 is a diagram for explaining an example of the data structure of the history management table 1300 after updating. In the history management table 1300, a history 1720 (two lines from the bottom) after the restoration is added to the history 1710 having been reserved (twelve lines from the top). The restoration from the trash box server 230 is also reserved as the historical information.

Further, when there is no history having been reserved in the past (in the case of having been deleted due to the setting of the trash box server 230, etc.), the file is treated as a file newly moved to the trash box and then the historical information as well as the file are reserved like the aforesaid "an example of the processing of moving a file to the trash box server 230".

Next, the explanation will be made as to "an example of the processing of storing a file of the same contents as a file within the trash box server 230 into the server 220".

In the case of newly registering a file "Report" already existing in the database 237 within the trash box server 230 into one of the server 220X, the server 220Y and the sever 220Z, the retrieval module 242 executes the retrieval by using a hash value to determine whether or not there is a file of the same contents within the database 237 within the trash box server 230. When there is a file with the same contents, a file is restored at a location intended to newly register the historical information in a correspondence manner.

Figure 18:
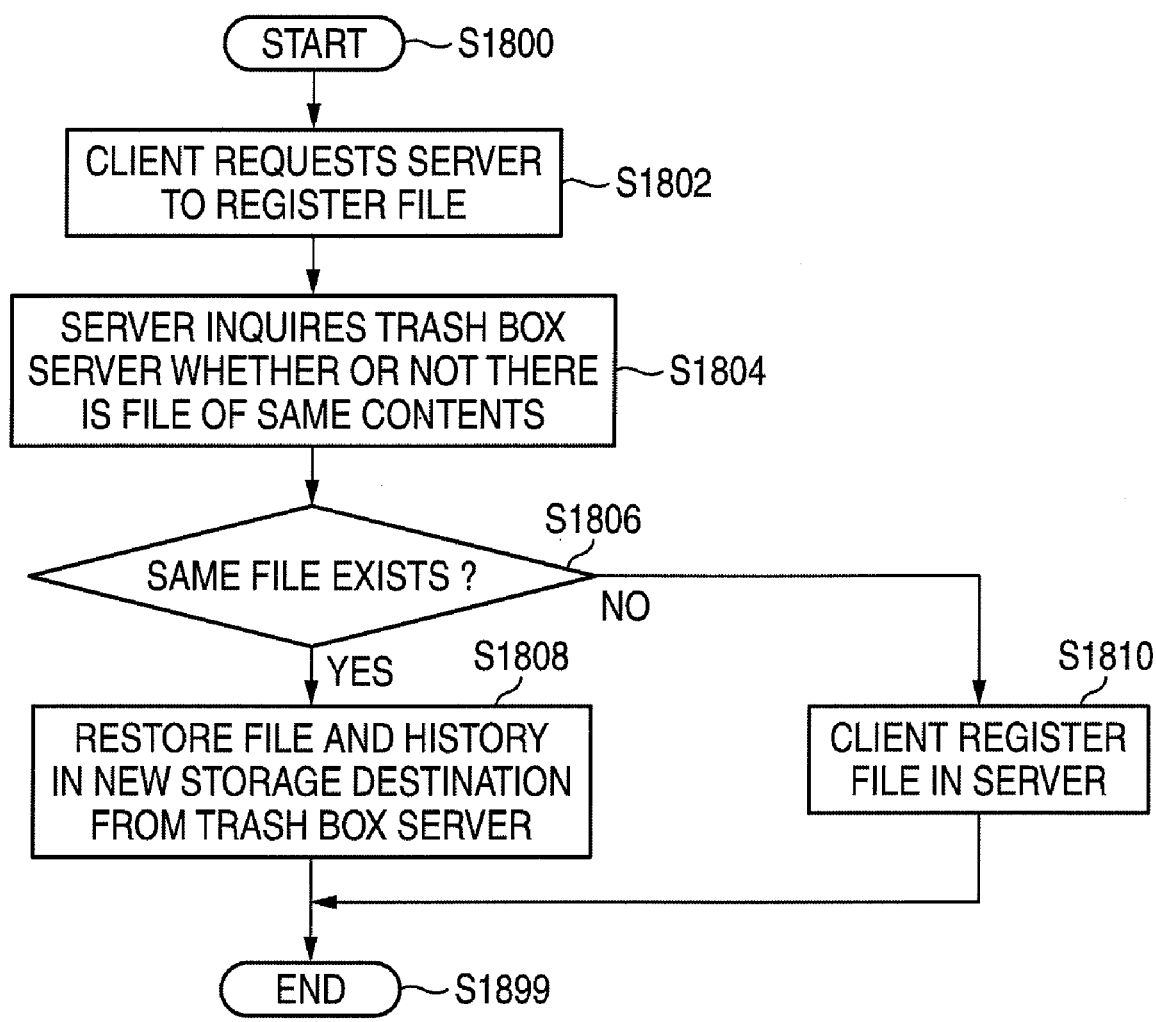
FIG. 18 is a flowchart showing an example of the processing of newly registering a file in the server according to the exemplary embodiment.

FIG. 18 is a flowchart showing an example of the processing of newly registering a file in the server 220 according to the exemplary embodiment.

In step S1802, the client 210 instructs the server 220 to register a file in accordance with the operation of a user.

In step S1804, the server 220 inquires of the sever 230 whether or not there is a file of the same contents within the database 237 within the trash box server 230.

In step S1806, the retrieval module 242 retrieves to determine whether or not there is a file of the same contents as that of the inquired file within the database 237 within the trash box server 230. When there is a file of the same contents (Yes), the processing proceeds to step S1808, whilst when here is not a file of the same contents (No), the processing proceeds to step S1810.

In step S1808, the restoration module 234 restores the file and the historical information made correspond to the file from the database 237 within the trash box server 230. The restoration indicates storing the file and the historical information made correspond to the file in the server 220 instructed to be registered in step S1802.

In step S1810, the file is registered in the server 220 from the client 210 in accordance with the instruction at step S1802.

Next, the explanation will be made as to "an example of the processing of notifying a file to be deleted to a user".

There is a case that a file made correspond to a plurality of historical information (a file deleted from a plurality of users) exists in the database 237 within the trash box server 230 and another file having the same contents as that of the file is stored in the server.

Since the file stored in the server has a high possibility of being to be deleted, such a fact is notified to a user having the file.

The history management modules 240 monitors the number of the historical information in the database 237 within the trash box server 230. The number of the historical information may be the number of the historical information subjected to the deleting operation or the number of uses who performed the deleting operation. This monitoring may be performed at every predetermined time period. A file having the historical information of a predetermined number or more is subjected to this processing.

Next, the history management modules 240 retrieves whether or not there is a file having the same contents as the subject file within each of the servers 220. In this case, the retrieval may be executed under an additional condition that the number of files stored in the database 224 of the server 220 is a predetermined number or more. Further, the retrieval may be executed under another additional condition that the remaining capacity of the database 224 of the server 220 is a predetermined amount or less.

As the result of the retrieval, when a file of the same contents exists in the server 220 (or when the aforesaid additional condition is further satisfied), a message such as "this file is moved to the trash box by many persons" is notified to the owner of the file to thereby to recommend the deletion of the file.

In the processing of the flowchart shown as an example in FIG. 5, when the restoring processing is executed as to files of the database 237 within the trash box server 230 referred by a plurality of the servers 220, the file capable of being referred by another server 220 and the historical information thereof is placed in the state of being reserved.

Figure 19:
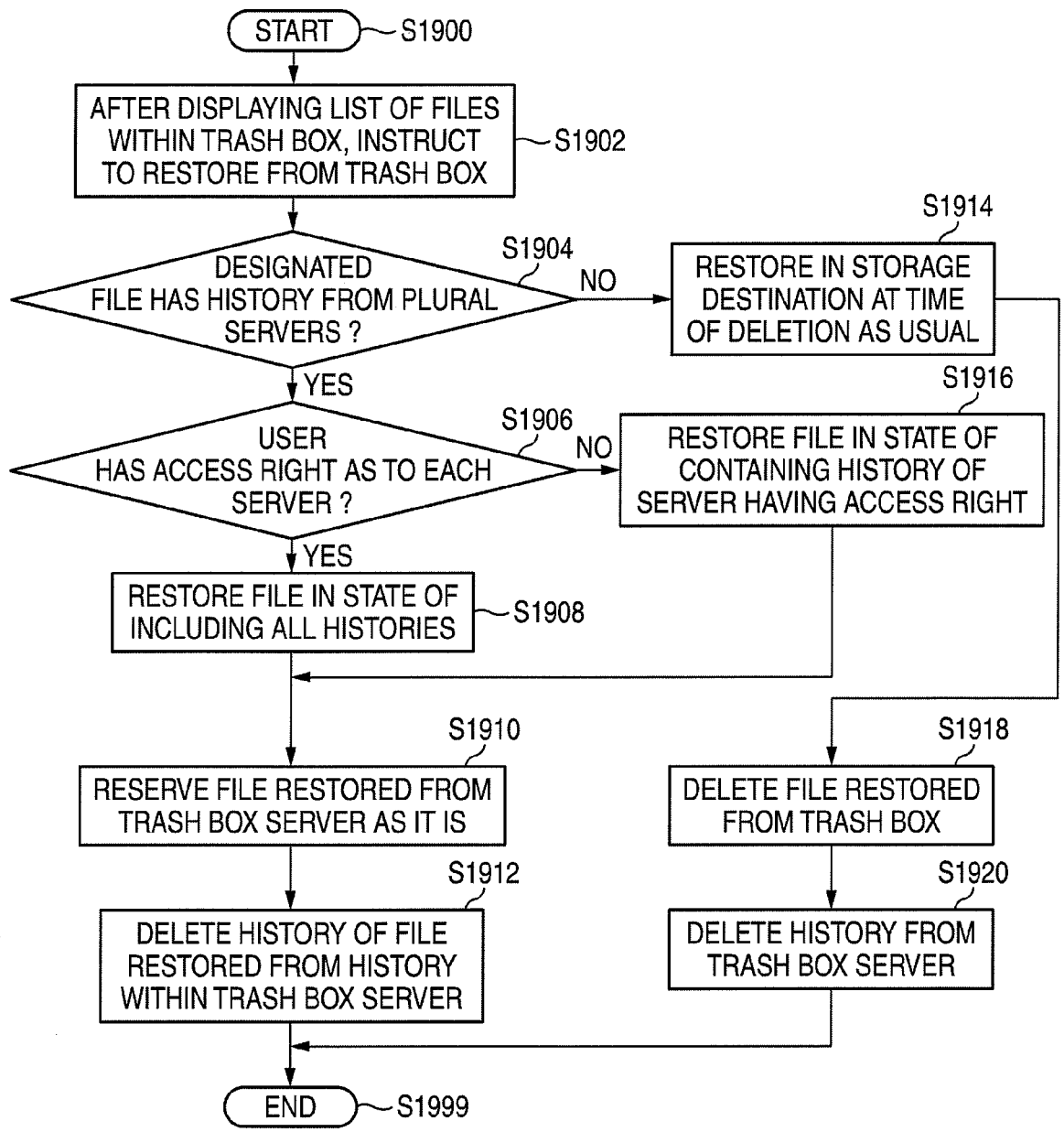
FIG. 19 is a flowchart showing an example of the difference restoration processing according to the exemplary embodiment.

However, when the restoring processing from the trash box server 230 is executed, the historical information relating to the subject server 220 may be deleted (hereinafter, this processing may also be called a difference restoration processing). FIG. 19 is a flowchart showing an example of the difference restoration processing according to the exemplary embodiment.

The processing from step S1902 to S1910 and the processing from step S1914 to S1920 correspond the processing from step S502 to S510 and the processing from step S514 to S520 shown as an example in FIG. 5, respectively.

In step S1912, from the historical information within the database 237 made correspond to the restored designated file, the historical information relating to the restored designated file is deleted. As a concrete example, the history management table 1300 of FIG. 20 is shown. FIG. 20 is a diagram for explaining an example of the data structure of the history management table 1300 after the update, which shows a state after the restoration of the file moved to the trash box server 230 from the sever 220X from the state of the history management table 1300 shown as an example in FIG. 16. That is, as shown as an example in FIG. 20, the historical information (deleted history 2010 shown as an example in FIG. 20) of "1" at the history ID column 1301 (or "X" at the server column 1302) is deleted from the history management table 1300.

There are two cases where the step S1914, step S1918 and step S1920 are performed. The first case is that a file is moved to the trash box server 230 from one of the servers 220 and restored. The processing of the first case is same as the flowchart shown as an example in FIG. 5. The second case is that although files are moved to the trash box server 230 from a plurality of the servers 220, the restoration is made and the historical information of the file moved to the trash box server 230 from one of the plural servers 220 is remained (for example, although three files having the same contents are moved to the trash box, the two of these files are restored), then the file corresponding to this one historical information is restored. The processing of the second case differs from the flowchart shown as an example in FIG. 5.

The hardware configuration of each of the computers (the information management system 100, the clients 210, the servers 220, the trash box server 230) for executing the programs according to the exemplary embodiment is a general computer as shown as an example in FIG. 21. To be concrete, the computer is a computer etc. capable of being a personal computer or a server. That is, as a concrete example, a CPU 2101 is used as a processing portion (calculation portion) and a RAM 2102, a ROM 2103 and an HD 2104 as a storage device. A hard disc drive may be used as the HD 2104, for example. The computer is configured by the CPU 2101 for executing the programs such as the first change module 155, the second change module 160, the first deletion module 165, the second deletion module 170, the management subject information storage capacity confirmation module 175, the notification module 185, the control module 190, the history management modules 240, the history operation module 241, the retrieval module 242 and the processing distribution module 232 etc., the RAM 2102 for storing such the programs and data, the ROM 2103 for storing the programs for starting the computer, etc., the HD 2104 acting as an auxiliary device, an input device 2106 such as a keyboard or a mouse for inputting data, an output device 2105 such as a CRT or a liquid display device, a communication line interface 2107 such as a network interface card for coupling to the communication network, and a bus 2108 for coupling these devices so as to communicate data thereamong. A plurality of such the computers may be coupled to each other via a network.

Among the aforesaid exemplary embodiments, the exemplary embodiment using the computer program is realized in a manner that the system of the aforesaid hardware configuration reads the computer program to thereby realize the exemplary embodiment in cooperation with the software and the hardware resource.

The hardware configuration shown in FIG. 21 is an example of the configuration, and the configuration of the exemplary embodiment is not limited to the configuration of FIG. 21 and may be modified in any manner so long as being capable of executing the modules explained in the aforesaid exemplary embodiment. For example, a part of the modules may be configured by a dedicated hardware (for example, ASIC etc.), or a part of the modules may be disposed within an external system and coupled via a communication line, or a plurality of systems each configured as shown in FIG. 21 may be coupled via a communication line to each other so as to be operated in a cooperation manner. Further, in particular, the hardware configuration may be incorporated into an information appliance, a copying machine, a facsimile machine, a scanner, a printer or a composite machine (an image processing device having at least two functions of a scanner, a printer, a copying machine, a facsimile etc.) etc. as well as a personal computer.

In the aforesaid exemplary embodiment, although a file is used as electronic information, a folder including a file may be used. The folder Although may be contained in a folder of higher lank thereof.

In the aforesaid exemplary embodiment, although the access right with respect to the respective servers 220 is used as the access right, an access right with respect to a file deleted in each of the servers 220 may be used.

Although the processing of restoring from the trash box server 230 is mainly shown as the concrete example, also in the case of the processing of deleting a file from the database 237 within the trash box server 230 (as a concrete example, which corresponds to the deletion of a file from the trash box or making the trash box empty), like the restoration processing explained by using the flowchart shown as an example in FIG. 19, in the case of files moved to the trash box server 230 from the servers 220, although a part of the historical information made correspond to a file to be deleted is deleted, the file itself is remained, whilst in the case of deleting the entirety of the historical information, the file may also be deleted.

Although the concrete example of the exemplary embodiment by using the clients 210, the servers 220 and the trash box server 230 is shown, the client 220 may be arranged to include both the functions of the servers 220 and the trash box server 230. For example, the exemplary embodiment may be incorporated into the trash box prepared in an OS (Operation System).

The programs explained above may be provided in a manner of being stored in a recording medium or provided via a communication line. In this case, for example, the program explained above may be grasped as "a computer readable recording medium storing program therein".

The "computer readable recording medium storing program therein" indicates a recording medium capable of being read by a computer in which a program is recorded and which is used for installing and executing a program and for distributing programs.

The recording medium includes, for example, a digital versatile disc (DVD) such as the standard "DVD-R, DVD-RW, DVD-RAM etc." defined in the DVD Forum or "DVD+R, DVD+RW etc." defined in the DVD+RW, or a compact disc (CD) such as a read only memory (CD-ROM), CD recordable (CD-R), CD rewritable (CD-RW) etc., a blue-ray disc (trade mark), a magneto-optical disc (MO), a flexible disc (FD), a magnetic tape, a hard disc, a read only memory (ROM), an electrically erasable programmable read-only memory (EEPROM), a flash memory, a random access memory (RAM) etc.

The program or a part thereof may be stored in the recording medium or distributed in a state of being recorded in the medium, for example. Further, the program or a part thereof may be transmitted by the communication, for example, via a transmission medium such as a wire network or a wireless communication network or a combination thereof such as a local area network (LAN), a metropolitan area network (MAN), a wide area network (WAN), an internet, an intranet, an extranet etc., or may be transmitted via a transfer waveform.

Furthermore, the program may be a part of other program or may be recorded in a recoding medium together with a separately provided another program. Further, the program may be recorded in a plurality of recording media in a divided manner. Further, the program may be recorded in such a manner of the compression or the encryption so long as being capable of being restored The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A computer readable medium storing a program causing a computer to execute a process for information management, the process comprising:
   (a) storing into a management subject information storing unit, management subject information associated with a destination indicating a first location, wherein the management subject information indicates electronic information to be managed;
   (b) changing the destination of the management subject information to a second location from the first location;
   (c) deleting, in a case of the destination of the management subject information indicating the second location and changing another destination associated with another piece of management subject information to the second location from another first location, said another piece of management subject information wherein said another piece of management subject information has the same content as the management subject information;
   (d) storing restoration information associated with the management subject information into a restoration information storing unit, and storing another piece of restoration information also associated with the management subject information into the restoration information storing unit, wherein the restoration information indicates that the destination of the management subject information includes historical information which corresponds the second location with the first location, and said another restoration information indicates that said another destination of said another management subject information includes historical information which corresponds the second location with said another first location; and
   (e) changing the destination of the management subject information to the first location from the second location based on the restoration information, and changing when said another restoration information is associated with the management subject information, said another destination of said another management subject information based on said another restoration information to the said another first location from the second location.

2. The computer readable medium according to claim 1, the process further comprising:
   deleting, when the destination of the management subject information corresponding to the second location is changed to the first location or when the correspondence of the management subject information to the second location is canceled, the restoration information associated with the management subject information; and
   deleting the management subject information corresponding to the second location when all pieces of restoration information associated with the management subject information disappears.

3. The computer readable medium according to claim 1, wherein
   in a case of making new management subject information correspond to yet another first location, when the new management subject information has same contents as the management subject information corresponding to the second location, the (e) storing includes associating the restoration information associated with the management subject information to the new management subject information intended to be correspond to the yet another first location.

4. The computer readable medium according to claim 1, wherein
   the computer is used by another information processing apparatus, and
   the management subject information is possessed by a user, and
   the process further comprises:
   when a predetermined number or more of pieces of the restoration information associates with the management subject information corresponding to the second location, and yet another management subject information having same contents as the management subject information corresponds to yet another first location, notifying an owner of the yet another management subject information corresponding to the yet another first location that the yet another management subject information is required to correspond to the second location.

5. The computer readable medium according to claim 4, wherein
the notifying includes notifying when a number of pieces of management subject information stored in the management subject information storage unit is a predetermined number or more or a remaining capacity of a storage area of the management subject information storage unit is a predetermined value or less.

6. An information management system, comprising:
a management subject information storing unit that stores management subject information associated with a destination indicating a first location, wherein the management subject information indicates electronic information to be managed;
a first changing unit that changes the destination of the management subject information to a second location from the first location;
a deleting unit that deletes, in a case of the destination of the management subject information indicating the second location and changing another destination associated with another piece of management subject information to the second location from another first location, said another piece of management subject information, wherein said another piece of management subject information has the same content as the management subject information;
a restoration information storing unit that stores restoration information associated with the management subject information, and stores another piece of restoration information also associated with the management subject information, wherein the restoration information indicates that the destination of the management subject information includes historical information which corresponds the second location with the first location, and said another restoration information indicates that said another destination of said another management subject information includes historical information which corresponds the second location with said another first location; and
a second changing unit that changes the destination of the management subject information to the first location from the second location based on the restoration information, and changes when said another restoration information is associated with the management subject information, said another destination of said another management subject information to the said another first location from the second location based on said another restoration information.

* * * * *